United States Patent
Zhao et al.

(10) Patent No.: US 10,915,735 B2
(45) Date of Patent: Feb. 9, 2021

(54) FEATURE POINT DETECTION METHOD AND APPARATUS, IMAGE PROCESSING SYSTEM, AND MONITORING SYSTEM

(71) Applicant: CANON KABUSHIKI KAISHA, Tokyo (JP)

(72) Inventors: Dongyue Zhao, Beijing (CN); Yaohai Huang, Beijing (CN); Xian Li, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 16/082,717

(22) PCT Filed: Feb. 22, 2017

(86) PCT No.: PCT/JP2017/006632
§ 371 (c)(1),
(2) Date: Sep. 6, 2018

(87) PCT Pub. No.: WO2017/154581
PCT Pub. Date: Sep. 14, 2017

(65) Prior Publication Data
US 2019/0073522 A1    Mar. 7, 2019

(30) Foreign Application Priority Data
Mar. 7, 2016    (CN) .......................... 2016 1 0127580

(51) Int. Cl.
*G06K 9/00*    (2006.01)
*G06K 9/62*    (2006.01)

(52) U.S. Cl.
CPC ..... *G06K 9/00281* (2013.01); *G06K 9/00248* (2013.01); *G06K 9/00275* (2013.01); *G06K 9/6203* (2013.01); *G06K 9/6209* (2013.01)

(58) Field of Classification Search
None
See application file for complete search history.

(56) References Cited

U.S. PATENT DOCUMENTS

2007/0217683 A1 * 9/2007 Kinoshita .......... G06K 9/00208
382/190
2008/0267459 A1 * 10/2008 Nakada .................. G09B 19/00
382/118

OTHER PUBLICATIONS

Xudong Cao, Face Alignment by Explicit Shape Regression, Int J Comput Vis, 2013, pp. 1-14, online, Springer Science+ Business Media, New York, United States.

(Continued)

*Primary Examiner* — Matthew C Bella
*Assistant Examiner* — Brian D Shin
(74) *Attorney, Agent, or Firm* — Canon U.S.A., Inc. I.P. Division

(57) ABSTRACT

One of the aspects of the present invention discloses a feature point detection method. The method comprises: acquiring a face region in an input image; acquiring first positions of first feature points and second feature points according to a pre-generated first model; estimating second positions of the first feature points according to the first positions of the first feature points and pre-generated second models; detecting third positions of the first feature points and the second feature points according to the second positions of the first feature points, the first positions of the second feature points and pre-generated third models. According to the present invention, the final detected face shape could approach to the actual face shape much more.

21 Claims, 14 Drawing Sheets

(56) References Cited

OTHER PUBLICATIONS

Xuehan Xiong, Supervised Descent Method and its Applications to Face Alignment, IEEE Conference on Computer Vision and Pattern Recognition, 2013, pp. 1-8, The Robotics Institute, Carnegie Mellon University, Pennsylvania, United States.
Michel Valstar, Facial Point Detection Using Boosted Regression and Graph Models, Jun. 13-18, 2010 IEEE Computer Society Conference on Computer Vision and Pattern Recognition, 2010, pp. 2729-2736, Publisher: IEEE, Conference Location: San Francisco, California, USA.
Albert Ali Salah, Robust Facial Landmarking for Registration, Annales des Télécommunications, Jan. 2007, pp. 1608-1633, vol. 62, issue 1-2, Publisher: Springer-Verlag, Heidelberg, Germany.

* cited by examiner

FEATURE POINT DETECTION METHOD AND APPARATUS, IMAGE PROCESSING SYSTEM, AND MONITORING SYSTEM

TECHNICAL FIELD

The present invention relates to image processing, and particularly relates to, for example, feature point detection method and apparatus.

BACKGROUND ART

Automatically and precisely detecting a face shape described by a set of feature points is a critical task in computer vision technical field, such as face recognition, expression analysis, 3D face modelling and so on. In recent years, regression based feature point detection methods have achieved great progress, such as the method disclosed in NPL 1 and the method disclosed in NPL 2.

These regression based methods mainly comprise: acquiring an average shape of the face in an input face image by using a pre-generated face shape model, wherein the average shape is described by a plurality of feature points in corresponding components of the face; and then using pre-generated cascaded regression models to gradually update the average shape of the face, so that the final detected face shape could approach to the actual face shape; wherein, as for one regression model, the operation comprises calculating position increments for all of the feature points and updating the positions of all of the feature points based on the corresponding position increments.

However, the above-mentioned regression based methods update the, positions of all of the feature points simultaneously when using each of the regression models, and the regression models used in the above-mentioned regression based methods are generated by using average position deviations of all of the feature points in a plurality of sample images. Thus, as for face images captured in different situations, such as the face image with illumination variations (shown in FIG. 1A), or the face image in which the face has dramatic expressions (shown in FIG. 1B), pose variations (shown in FIG. 1C) or occlusions (shown in FIG. 1D), some feature points could not be found the most accurate positions by using the above-mentioned regression based methods. That is to say, the final detected face shape could not approach to the actual face shape.

CITATION LIST

Non Patent Literature

NPL 1: Face Alignment by Explicit Shape Regression (Xudong Cao, Yichen Wei, Fang Wen, Jian Sun. CVPR, 2012)
NPL 2: Supervised Descent Method and its Applications to Face Alignment (X. Xiong and F. De la Torre. CVPR, 2013)

SUMMARY OF INVENTION

Therefore, in view of the above recitations in Description of the Related Art, the present disclosure aims to solve the problems as described above.

According to one aspect of the present invention, there is provided a feature point detection method, comprising: an acquisition step of acquiring a face region in an input image; a feature point acquisition step of acquiring first positions of first feature points and second feature points in corresponding components of the face according to a pre-generated first model, wherein at least one of the components comprises the first feature points and the first feature points are feature points whose average deviations of feature changing in the corresponding components are less than a first threshold; a first estimating step of estimating second positions of the first feature points in the corresponding components according to the first positions of the first feature points and at least one pre-generated second model; and a feature point detection step of detecting third positions of the first feature points and the second feature points in the corresponding components according to the second positions of the first feature points, the first positions of the second feature points and at least one pre-generated third model.

Taking advantage of the present invention, the final detected face shape could approach to the actual face shape much more.

Further characteristic features and advantages of the present invention will be apparent from the following description with reference to the drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1A:
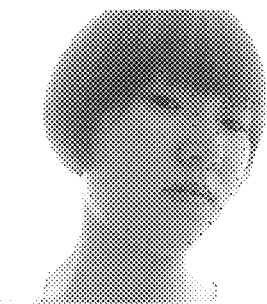
FIG. 1A schematically shows a face image captured in different situations.
Figure 1B:
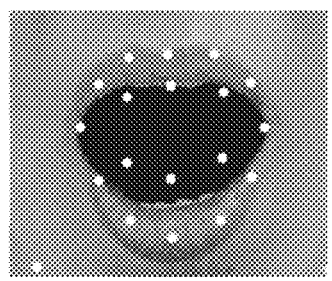
FIG. 1B schematically shows a face image captured in different situations.
Figure 1C:
FIG. 1C schematically shows a face image captured in different situations.

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be a part of the specification where appropriate.

Please note that similar reference numerals and letters refer to similar items in the figures, and thus once an item is defined in one figure, it need not be discussed for following figures.

For most regression processes, accuracy of the input features/values will directly affect accuracy of the results output from the regression process. Taking feature point detection for example, in case that the face shape input into the regression models is more approaching to the actual face shape, the more accurate face shape would be obtained through the regression models. That is to say, in case that positions of the feature points input into the regression models are more approaching to the actual position of the face, the more accurate positions of the feature points would be obtained through the regression models. Therefore, in order to obtain the more accurate positions of the feature points during the feature point detection, it is necessary to improve the accuracy of the positions of the feature points input into the regression models.

Generally, a face comprises seven components, that is, a face contour component, two eyebrow components, two eye components, a nose component and a mouth component. And there are certain relations among the feature points used to describe the face shape.

Figure 2A:
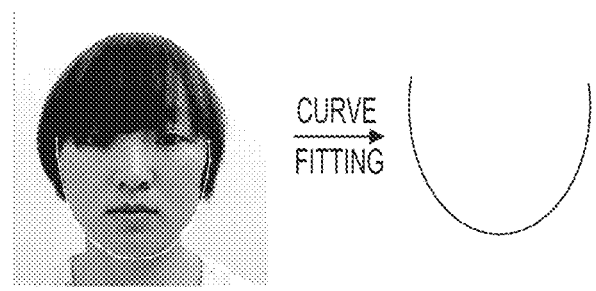
FIG. 2A schematically shows shape curve of the face contour component.

On one hand, in each component, the feature points used to describe the shape of this component could be fitted into a shape curve through the existing curve fitting algorithms and generally the shape curve is invariable regardless which kind of situation the face images are captured in. Taking the face contour component shown in FIG. 2A for example, the feature, points used to describe the face contour could be fitted by using a quadratic function, such as $f(x)=ax^2+bx+c$. Therefore, as for one component (such as the face contour component), in case several feature points (such as at least two feature points) with the more accurate positions could be estimated in this component, the more accurate positions for the other feature points used to describe the shape of this component could be estimated according to the invariable shape curve.

Figure 2B:
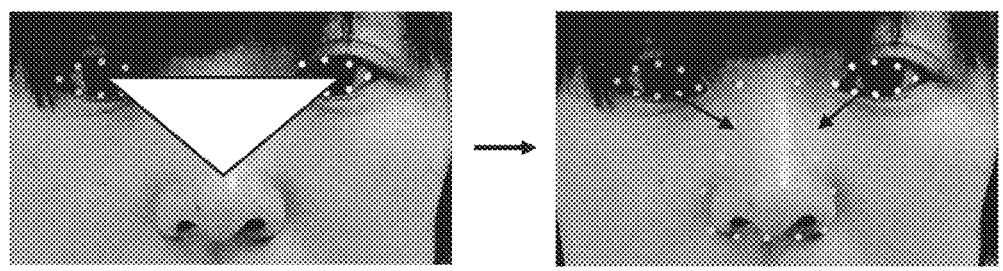
FIG. 2B schematically shows position relation among the two eye components and the nose component.

On the other hand, there are certain position relations among the components, and generally these position relations are invariable regardless which kind of situation the face images are captured in. Taking the two eye components and the nose component shown in FIG. 2B for example, the position relation among the two eye components and the nose component is that the nose component is always located just below the two eye components and the center positions of the two eye components and the center position of the nose component could compose an isosceles triangle since the symmetry of the face. Therefore, in case several feature points (such as at least two feature points) with the more accurate positions could be estimated in at least one component (such as the two eye components), the more accurate positions for the feature points in other components (such as the nose component) could be estimated according to the invariable position relations among these components.

Figure 1D:
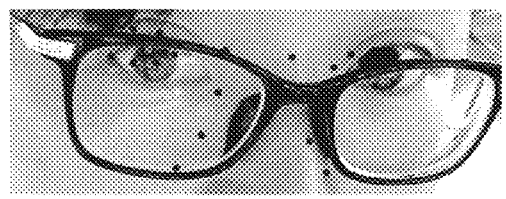
FIG. 1D schematically shows a face image captured in different situations.
Figure 3:
FIG. 3 schematically shows the exemplary feature points whose average deviations of feature changing in the corresponding components are less than a pre-defined threshold.

Furthermore, regardless the face images are captured in which kind of situation, there are some feature points which are more robust and stable and could be estimated the more accurate positions more easily in each component. Generally, these feature points are the feature points whose average deviations of feature changing (such as texture feature's changing, color feature's changing and so on) in the corresponding components are less than a pre-defined threshold (i.e. first threshold which will be described hereinafter), and most of these feature points are on the corner point of the corresponding components. Wherein, the average deviations are measured as standard deviations for example. Taking one eye component for example, the two feature points on the corner point of the eye are more robust and stable than the other feature points of the eye. That is to say, the two feature points on the corner point of the eye are the feature points whose average deviations of feature changing in the eye component are less than the pre-defined threshold. The exemplary feature points whose average deviations of feature changing in the corresponding components are less than the pre-defined threshold are shown in FIG. 3, such as the feature points with the trigonometric shapes. In addition, unavoidably, in some situations where the face images are captured, not all of the components exists the feature points whose average deviations of feature changing in the corresponding components are less than the pre-defined threshold. For example, in case the face has an occlusion (shown in FIG. 1D), the two eye components do not comprise the feature points whose average deviations of feature changing are less than the pre-defined threshold.

Therefore, the present invention uses the accurate positions of the feature points (referred as first feature points hereinafter) whose average deviations of feature changing in at least one component are less than the pre-defined threshold to improve the accuracy of the positions of the feature points during the feature point detection. And furthermore, in order to further improve the accuracy of the positions of the feature points during the feature point detection, the present invention further uses the accurate positions of the first feature points to improve the accuracy of the positions of the other feature points (referred as second feature points hereinafter), wherein the second feature points are the feature points used to describe the face shape except the first feature points.

Hardware Configuration

Figure 4:
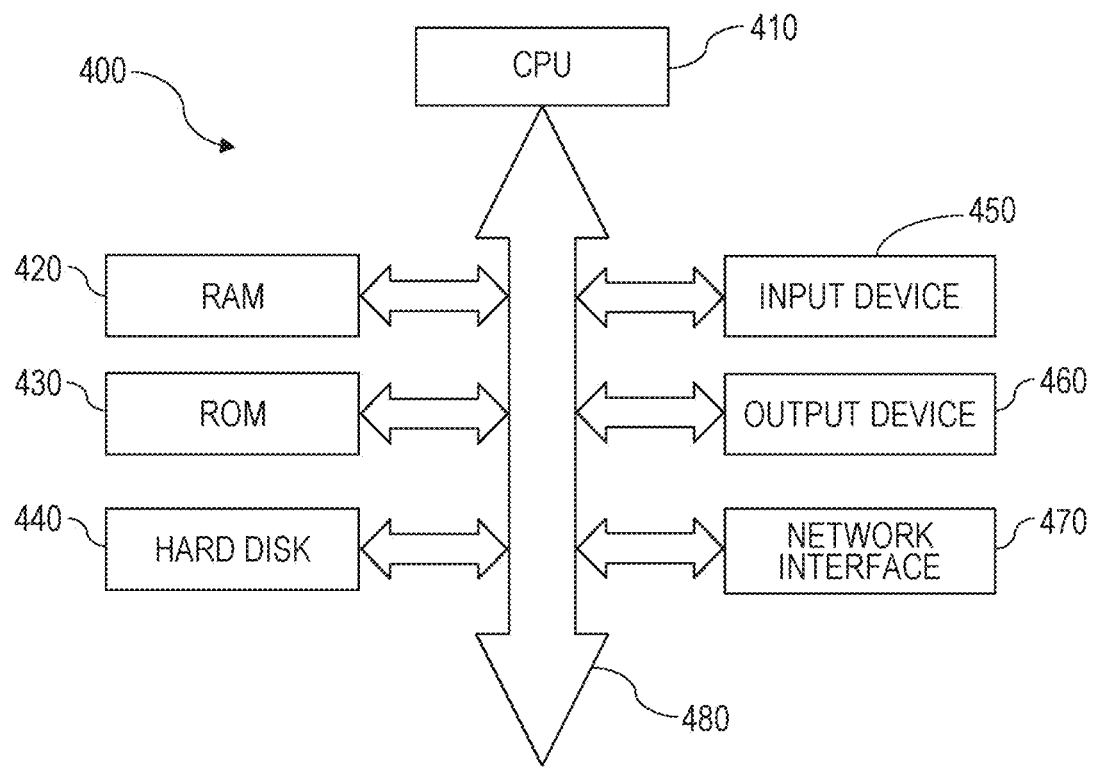
FIG. 4 is a block diagram schematically showing the hardware configuration that can implement the techniques according to the embodiments of the present invention.

The hardware configuration that can implement the techniques described hereinafter will be described first with reference to FIG. 4. FIG. 4 is a block diagram schematically showing the hardware configuration 400 that can implement the techniques according to the embodiments of the present invention.

The hardware configuration 400, for example, includes Central Processing Unit (CPU) 410, Random Access Memory (RAM) 420, Read Only Memory (ROM) 430, Hard Disk 440, input Device 450, Output Device 460, Network Interface 470 and System Bus 480. Further, the hardware configuration 400 could be implemented by, such as personal data assistant (PDA), mobile phone, digital camera, video camera, laptop, desktop or other suitable electronic device.

The CPU 410 could be any suitable programmable control devices (such as processors) and could execute a variety of functions, to be described hereinafter, by executing a variety of application programs that are stored in the ROM 430 or the Hard Disk 440 (such as memories). The RAM 420 is used to temporarily store the program or the data that is loaded from the ROM 430 or the Hard Disk 440, and is also used as a space wherein the CPU 410 executes the variety of programs, such as carrying out the techniques which will be described in detail hereinafter by referring to FIGS. 5 to 17, as well as other available functions. The Hard Disk 440 could store many kinds of information, such as an operating system (OS), the various applications, a control program, and models and data pre-stored or pre-generated by the manufacture, wherein the models could be first models, second models and third models and the data could be Thresholds (THs) which will be described hereinafter for example.

In one implementation, the Input Device 450 could allow the user to interact with the hardware configuration 400, such as the user could input the face images through the Input Device 450. And the Input Device 450 can take a variety of forms, such as a button, a keypad or a touch screen. The Output Device 460 could display the processing results (such as the feature point detection results) to the user. And the Output Device 460 can take a variety of forms, such as a Cathode Ray Tube (CRT) or a liquid crystal display. In addition, the Input Device 450 and the Output Device 460 could be integrally incorporated, if the hardware configuration 400 is a so-called device such as intelligent mobile phone, PDA, digital camera, tablet computer, or other suitable electronic device. Furthermore, the Input Device 450 and the Output Device 460 could be discretely incorporated, if the hardware configuration 400 is a so-called device such as conventional mobile phone, laptop, desktop, or other suitable personal device.

In another implementation, the Input Device 450 could be an input interface and for example could receive the face images which are output from the special electronic devices, such as digital cameras. And the Output Device 460 could be an output interface and could output the processing results to the subsequence operations, such as the face recognition operation which will be described hereinafter.

The Network Interface 470 provides an interface for connecting the hardware configuration 400 to the network (not shown). For example, the hardware configuration 400 could perform, via the Network Interface 470, data communication with other electronic device connected via the network. Alternatively, a wireless interface may be provided for the hardware configuration 400 to perform wireless data communication. The system bus 480 may provide a data transfer path for transferring data to, from, or between the CPU 410, the RAM 420, the ROM 430, the Hard Disk 440, the Input Device 450, the Output Device 460 and the Network Interface 470, and the like to each other. Although referred to as a bus, the system bus 480 is not limited to any specific data transfer technology.

The above described hardware configuration 400 is merely illustrative and is in no way intended to limit the invention, its application, or uses. And for the sake of simplicity, only one hardware configuration is shown in FIG. 4. However, a plurality of hardware configurations can also be used as needed.

Feature Point Detection Processing

Figure 5:
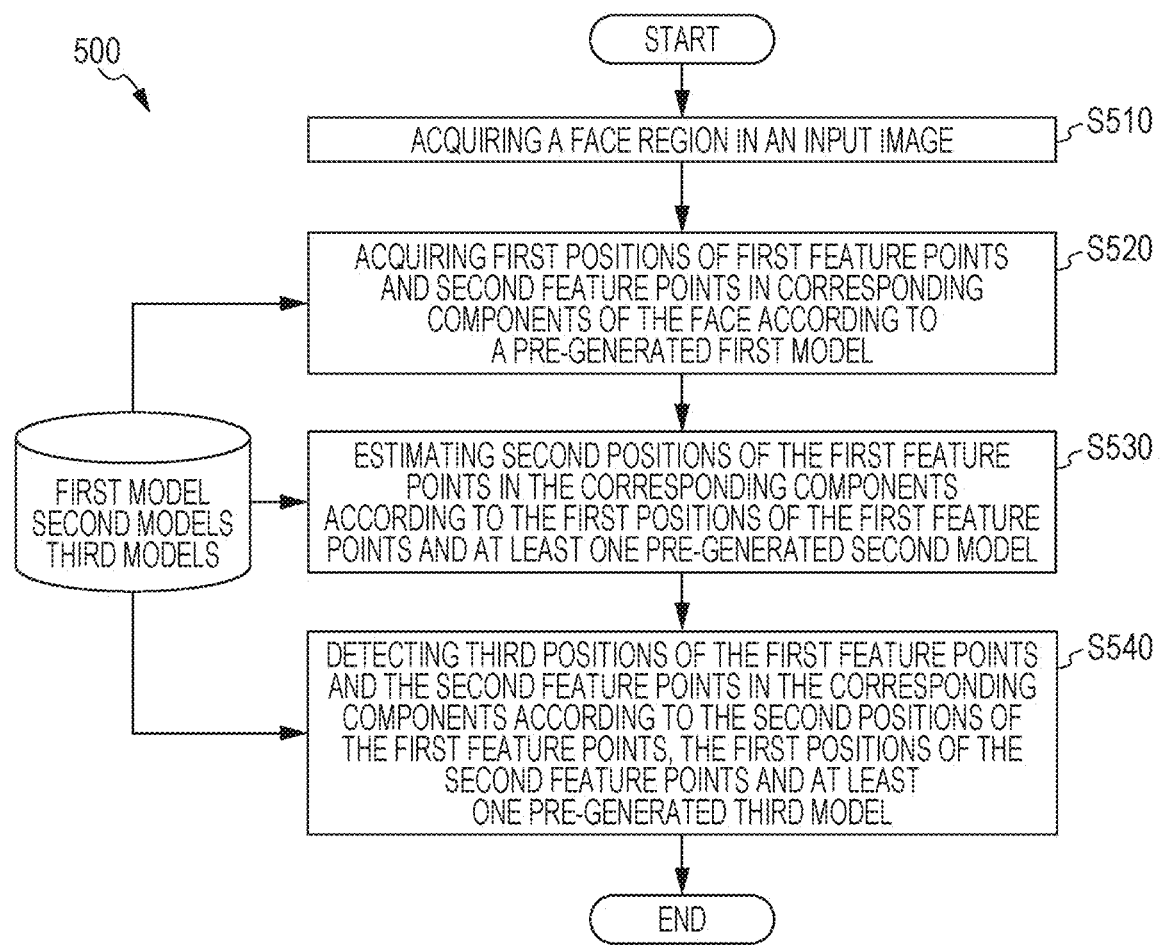
FIG. 5 schematically shows a flowchart of a feature point detection processing according to the first embodiment of the present invention.

The feature point detection processing executed by the hardware configuration 400 shown in FIG. 4 will be described with reference to FIG. 5. FIG. 5 schematically shows a flowchart 500 of a feature point detection processing according to the first embodiment of the present invention.

The program required for feature point detection illustrated in the flowchart of FIG. 5 is stored in the Hard Disk 440 together with the other programs, such as program required for feature point detection illustrated in the flowchart of FIG. 8 which will be described in detail hereinafter. The program stored in the Hard Disk 440 would be developed into the RAM 420 when the CPU 410 needs to carry out the flowchart of FIG. 5. The processing of the flowcharts that will be described later is also developed into the RAM 420 and carried out by the CPU 410 in the same manner.

As described above, first, the Input Device 450 shown in FIG. 4 would acquire one image which is output from the special electronic device (such as the digital camera) or is input by the user. Wherein, in this embodiment, the acquired image is a face image with a face region and the acquired image is a normalized face image that is normalized by existing normalization methods, such as affine transformation algorithm. Second, the input Device 450 would transfer the acquired image to the CPU 410 via the system bus 480.

And then, as shown in FIG. 5, in acquisition step S510, the CPU 410 would acquire the acquired image from the Input Device 450 through the system bus 480 and acquire the face region in the acquired image.

In feature point acquisition step S520, the CPU 410 would acquire first positions of first feature points and second feature points in corresponding components of the face according to a pre-generated first model. Wherein at least one of the components comprises the first feature points and the first feature points are feature points whose average deviations of feature changing in the corresponding components are less than a first threshold (TH1). Wherein, the TH1 could be predefined by the manufacture according to the experience or prior knowledge. And further, in the present invention, the first feature points could be regarded as stable feature points, and the second feature points could be regarded as unstable feature points.

The pre-generated first model could be generated by the manufacture from a plurality of sample images in advance and then could be stored in the ROM 430 or the Hard Disk 440 shown in FIG. 4 and/or could be stored in the Server connected with the hardware configuration 400 via the network (not shown). And the pre-generated first model comprises shape curves among the first feature points and the second feature points in the corresponding components, position relations among the components and an average shape of the face in which the first feature points and the second feature points are labelled out in die corresponding components. Thus, the first positions of the first feature points and the second feature points acquired in the feature point acquisition step S520 actually are the corresponding positions of the first feature points and the second feature points in the average shape of the face in the pre-generated first model.

In one implementation, the pre-generated first model could be generated from the plurality of the sample images by using the existing regression based algorithms (such as Explicit Shape Regression (ESR) algorithm, or Supervised Descent Model (SDM) algorithm) or the existing shape based algorithms (such as Active Shape Model (ASM) algorithm) for example. And before generating the first model, the first feature points and the second feature points could be labelled out in the corresponding components in each sample image manually by the manufacture according to the experience or prior knowledge, so that the feature points generated to describe the average shape of the face would be labelled out as the first feature points and the second feature points in the corresponding components. Furthermore, during generating the first model, shape curves among the first feature points and the second feature points in the corresponding components of the face could be calculated based on the existing curve fitting algorithms (such as least squares Algorithm), so that the subsequence operations which will be described hereinafter could use the calculated shape curves.

As described above, not all of the components of the face exists the first feature points in some situations, but the feature, points in which components and which feature points are labelled as the first feature points are predetermined by the manufacture, thus, at least one of the components of the face comprises the first feature points.

As shown in FIG. 5, after the CPU 410 acquires the first positions of the first feature points and the second feature points in the corresponding components of the face, in first estimating step S530, the CPU 410 would estimate second positions of the first feature points in the corresponding components according to the first positions of the first feature points and at least one pre-generated second model. The pre-generated second models could be generated by the manufacture from a plurality of sample images in advance and then could be stored in the ROM 430 or the Hard Disk 440 shown in FIG. 4 and/or could be stored in the Server connected with the hardware configuration 400 via the network (not shown). In one implementation, the pre-generated second models are regression models and are generated from the plurality of the sample images by using the generating method which will be described in detail hereinafter with reference to FIG. 13 and FIG. 14.

Figure 6:
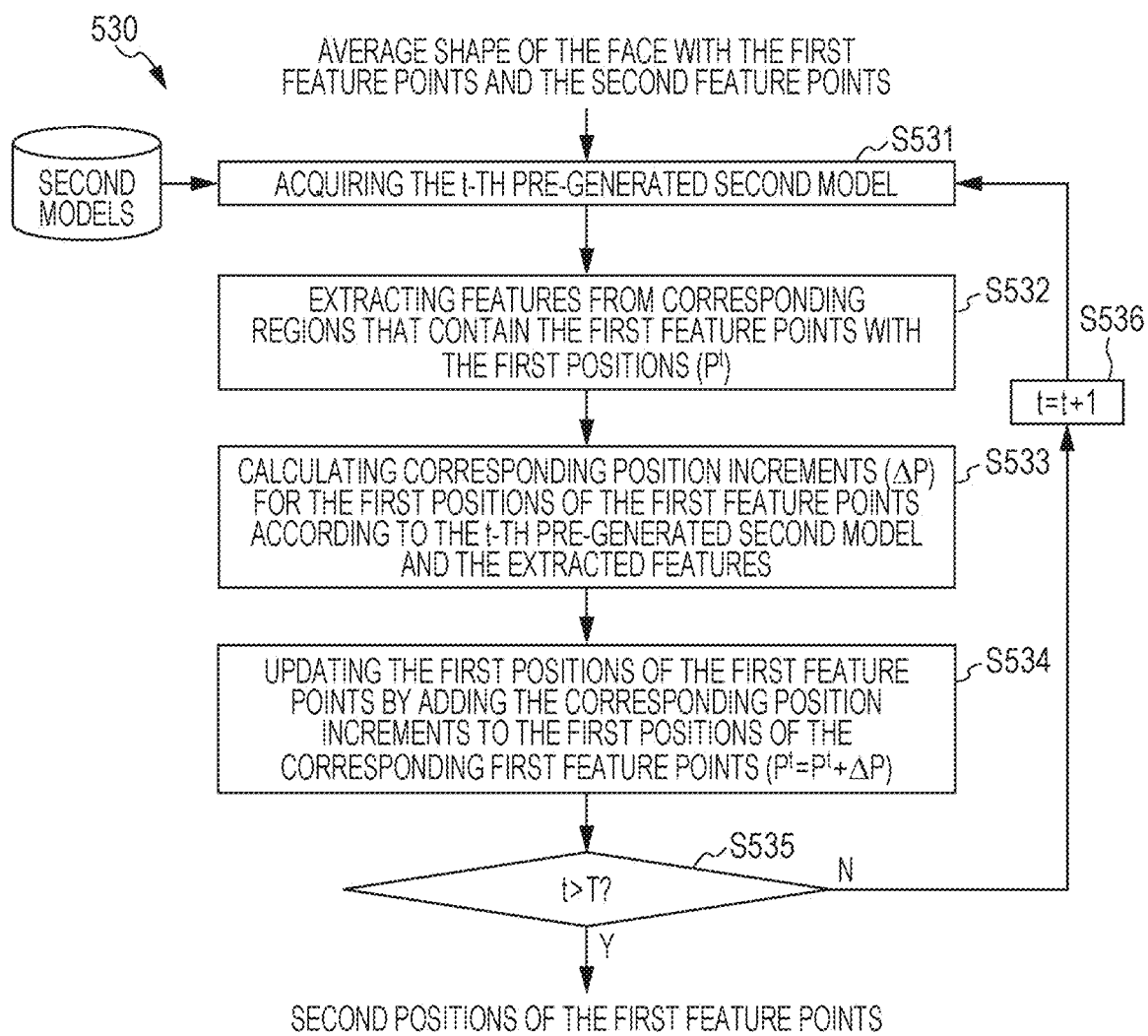
FIG. 6 is a flowchart schematically showing a detailed procedure of processing of the step S530 shown in FIG. 5.

In one implementation, the method disclosed in NPL 2 is used in the first estimating step S530 to estimate the second positions of the first feature points in the corresponding components. In another implementation, the detailed procedure of the first estimating step S530 is referred to FIG. 6. FIG. 6 is a flowchart schematically showing a detailed procedure of processing of the step S530 shown in FIG. 5.

As shown in FIG. 6, first, in step S531, the CPU 410 would acquire the t-th pre-generated second model (such as the 1st pre-generated second model) from the Hard Disk 440 for example.

Second, in step S532, the CPU 410 would extract features from corresponding regions that contain the first feature points with the first positions (such as the corresponding positions of the first feature points in the average shape of the face), wherein the first position for each first feature point could be represented as $P^r$ for example. The extracted features could be Scale Invariant Feature Transform (SIFT) features, Speeded-Up Robust Features (SURF features) or Histogram of Oriented Gradients (HOG) features for example. The regions that contain the first feature points with the first positions are for example the regions each of which is centered on one first feature point with the corresponding first position and size of each region is 32*32 pixels for example. However, it is readily apparent that it is not necessarily limited thereto.

In step S533, the CPU 410 would calculate corresponding position increments for the first positions of the first feature points according to the t-th pre-generated second model and the extracted features, wherein the corresponding position increment for the first position of each first feature point could be represented as $\Delta P$ for example. As described above, in one implementation, the pre-generated second models could be the regression models. Therefore, the corresponding position increments for the first positions of the first feature points would be calculated by projecting the extracted features (such as feature vectors) onto the t-th pre-generated second model.

In step S534, the CPU 410 would update the first positions of the first feature points by adding the corresponding position increments to the first positions of the corresponding first feature points, wherein the updated first position for one first feature point could be represented as $P^r = P^r + \Delta P$ for example.

And then, in step S535, the CPU 410 would judge whether t is larger than T. Wherein, T represents the total cascaded number of the pre-generated second models, and t represents current number of the pre-generated second models that have been used during the procedure of the first estimating step S530.

In case the CPU 410 judges that t is larger than T, the CPU 410 would determine the final updated first positions of the first feature points as the second positions of the first feature points. Otherwise, the CPU 410 would set t=t+1, and would repeat to execute the corresponding operations in S531 to S535.

Now goes hack to FIG. 5, after the CPU 410 estimates the second positions of the first feature points in the corresponding components, in feature point detection step S540, the CPU 410 would detect third positions of the first feature points and the second feature points in the corresponding components according to the second positions of the first feature points, the first positions of the second feature points and at least one pre-generated third model. That is to say, after the feature point detection step S540, the CPU 410 would detect the final face shape of the face which is described by the first feature points and the second feature points with the third positions in the acquired image.

The pre-generated third models could be generated by the manufacture from a plurality of sample images in advance and then could be stored in the ROM 430 or the Hard Disk 440 shown in FIG. 4 and/or could be stored in the Server connected with the hardware configuration 400 via the network (not shown). In one implementation, the pre-generated third models are regression models and are generated from the plurality of the sample images by using the generating method which will be described in detail hereinafter with reference to FIG. 13 and FIG. 14.

Figure 7:
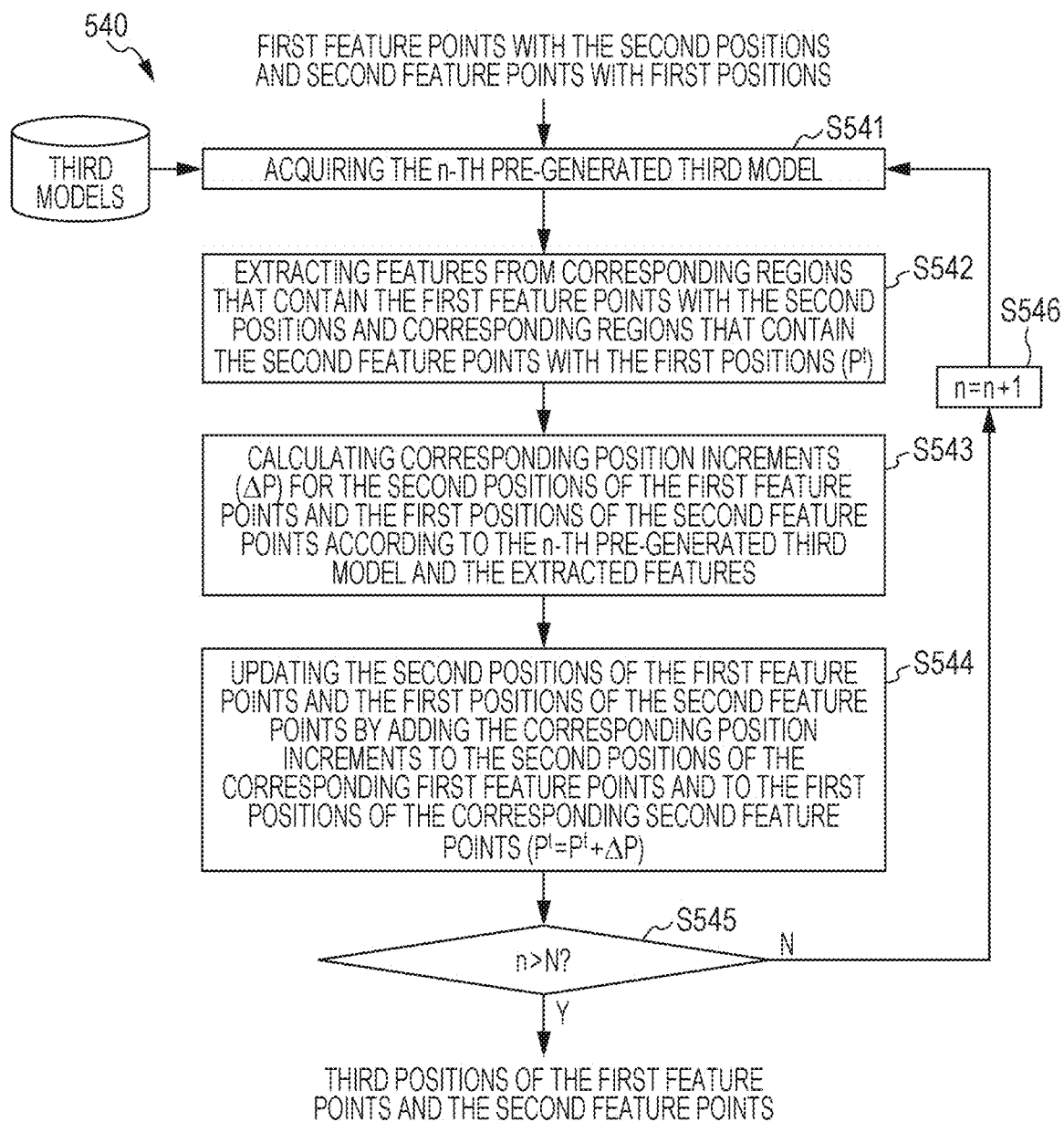
FIG. 7 is a flowchart schematically showing a detailed procedure of processing of the step S540 shown in FIG. 5.

In one implementation, the method disclosed in NPL 2 could also be used in the feature point detection step S540 to estimate the third positions of the first feature points and the second feature points in the corresponding components. In another implementation, the detailed procedure of the feature point detection step S540 is referred to FIG. 7. FIG. 7 is a flowchart schematically showing a detailed procedure of processing of the step S540 shown in FIG. 5.

As shown in FIG. 7, first, in step S541, the CPU 410 would acquire the n-th pre-generated third model (such as the 1st pre-generated third model) from the Hard Disk 440 for example.

Second, in step S542, the CPU 410 would extract features from corresponding regions that contain the first feature points with the second positions and corresponding regions that contain the second feature points with the first positions (such as the corresponding positions of the second feature points in the average shape of the face), wherein the second position for each first feature point and the first position for each second feature point could be represented as $P^r$ for example. The extracted features also could be the SIFT features, the SURF features or the HOG features for example. The regions that contain the first feature points with the second positions are for example the regions each of which is centered on one first feature point with the corresponding second position and size of each region is 32*32 pixels for example. And the regions that contain the second feature points with the first positions are for example the regions each of which is centered on one second feature point with the corresponding first position and size of each region is 32*32 pixels for example. However, it is readily apparent that it is not necessarily limited thereto.

In step S543, the CPU 410 would calculate corresponding position increments for the second positions of the first feature points and the first positions of the second feature points according to the n-th pre-generated third model and the extracted features, wherein the corresponding position increment for the second position of each first feature point and the first position of each second feature point could be represented as $\Delta P$ for example. As described above, in one implementation, the pre-generated third models could be the regression models. Therefore, the corresponding position increments for the second positions of the first feature points and the corresponding position increments for the first positions of the second feature points would be calculated by projecting the extracted features (such as feature vectors) onto the n-th pre-generated third model.

In step S544, the CPU 410 would update the second positions of the first feature points and the first positions of the second feature points by adding the corresponding position increments to the second positions of the corresponding first feature points and to the first positions of the corresponding second feature points, wherein the updated second position for one first feature point and the updated first position for one second feature point could be represented as $P^r = P^r + \Delta P$ for example.

And then, in step S545, the CPU 410 would judge whether n is larger than N. Wherein, N represents the total cascaded number of the pre-generated third models, and n represents current number of the pre-generated third models that have been used during the procedure of the feature point detection step S540.

In case the CPU 410 judges that n is larger than N, the CPU 410 would determine the final updated second positions of the first feature points and the final updated first positions of the second feature points as the third positions of the first feature points and the second feature points. Otherwise, the CPU 410 would set n=n+1, and would repeat to execute the corresponding operations in S541 to S545.

Finally, after the CPU 410 detects the final face shape of the face which is described by the first feature points and the second feature points with the third positions in the acquired image, the CPU 410 would transfer the detected final face shape of the face to the Output Device 460 shown in FIG. 4 via the system bus 480 for displaying the processing results to the user or for the subsequence operations which will be described hereinafter, such as the face recognition operation.

As described above, in order to obtain the more accurate positions of the feature points during the feature point detection, it is necessary to improve the accuracy of the positions of the feature points input into the feature point detection processing. In this first embodiment, the present invention firstly acquires the original positions (i.e. the first positions) of the first feature points whose average deviations of the feature changing in the corresponding components are less than the TH1 and estimates the more accurate positions (i.e. the second positions) for the first feature points. And then the present invention detects the final face shape of the face by using the estimated more accurate positions of the first feature points. Since the positions of part of the feature points used to detect the final face shape of the face are more accurate, the final detected face shape could be more accurate. That is to say, the final detected face shape could approach to the actual face shape much more.

As described in the first embodiment as shown in FIG. 5, the present invention only estimates the more accurate positions for the first feature points to detect the final face shape of the face. However, as described above, there are certain position relations among the feature points used to describe the face shape. For example, the feature points used to describe the shape of one component could be fitted into a shape curve, and there are certain position relations among the components. Thus, the accuracy of the original positions (i.e. the first positions) of the second feature points could also be improved based on the more accurate positions of the first feature points by using the above-mentioned position relations among the first feature points and the second feature points.

Therefore, another embodiment of the present invention will be described with reference to FIG. 8. FIG. 8 schematically shows another flowchart 800 of a feature point detection processing according to the second embodiment of the present invention. The feature point detection processing of this second embodiment also could be executed by the hardware configuration 400 shown in FIG. 4.

Figure 8:
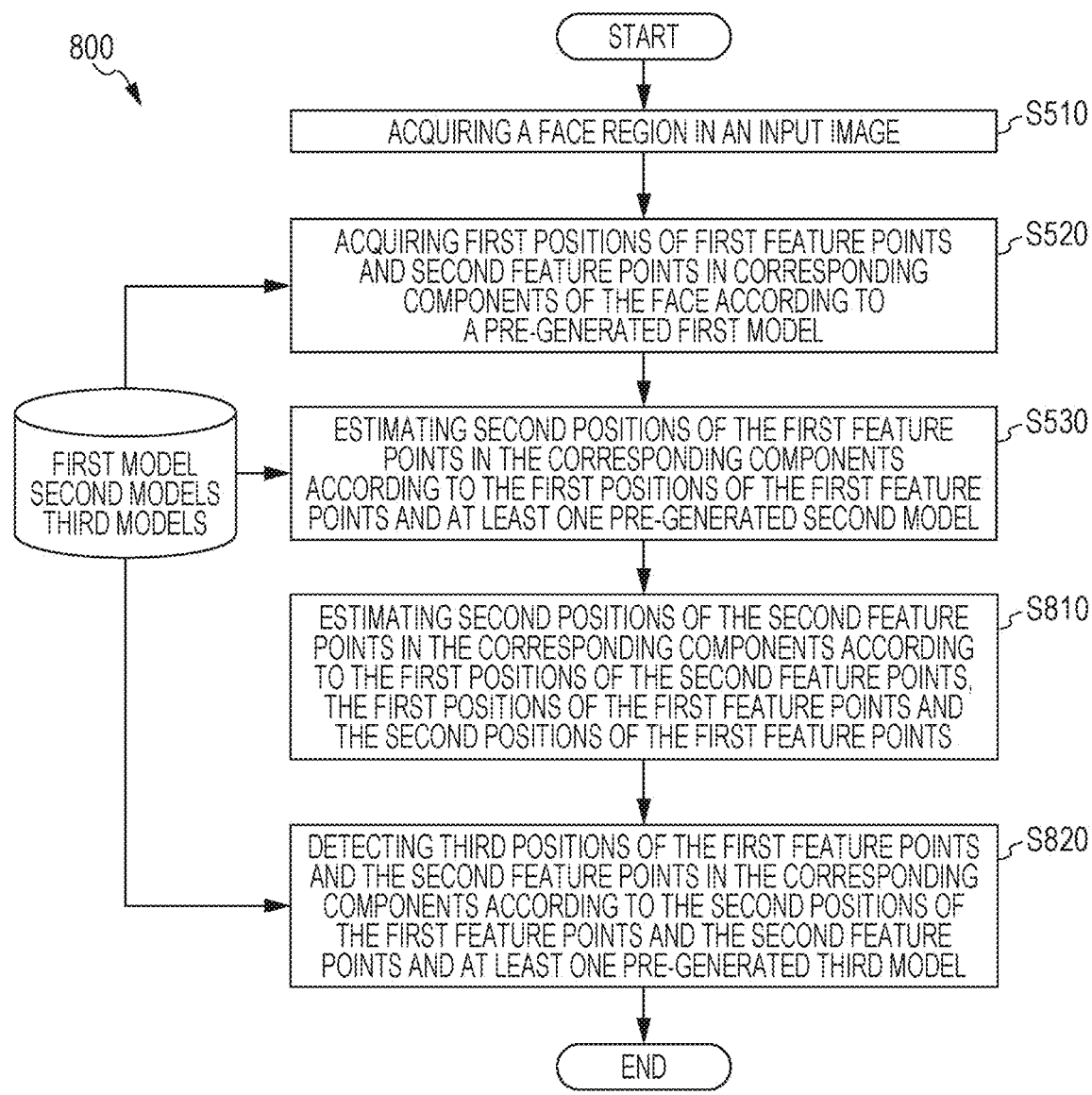
FIG. 8 schematically shows another flowchart of a feature point detection processing according to the second embodiment of the present invention.

Comparing FIG. 8 with FIG. 5, there are two main differences in the flowchart 800 shown in FIG. 8:

First, the feature point detection processing further comprises a second estimating step S810. In the second estimating step S810, the CPU 410 would estimate second positions of the second feature points in the corresponding components according to the first positions of the second feature points, the first positions of the first feature points and the second positions of the first feature points. The detailed procedure of the second estimating step S810 will be described hereinafter with reference to FIG. 9 to FIG. 12E.

Second, in the feature point detection step S820, the CPU 410 would detect the third positions of the first feature points and the second feature points in the corresponding components according to the second positions of the first feature points and the second feature points and the at least one pre-generated third model. The main difference between the feature point detection step S820 and the feature point detection step S540 is only that, in step S820, the CPU 410 use the second positions of the second feature points estimated in the second estimating step S810 instead of the first positions of the second feature points used in step S540, thus the detailed procedure of the feature point detection step S820 is similar with the detailed procedure of the feature point detection step S540 as described above, and the corresponding description will be not repeated herein.

In addition, since the acquiring step S510, the feature point acquisition step S520 and the first estimating step S530 shown in FIG. 8 are the same as the corresponding steps S510 to S530 shown in FIG. 5, the detailed description would not be repeated herein.

Figure 9:
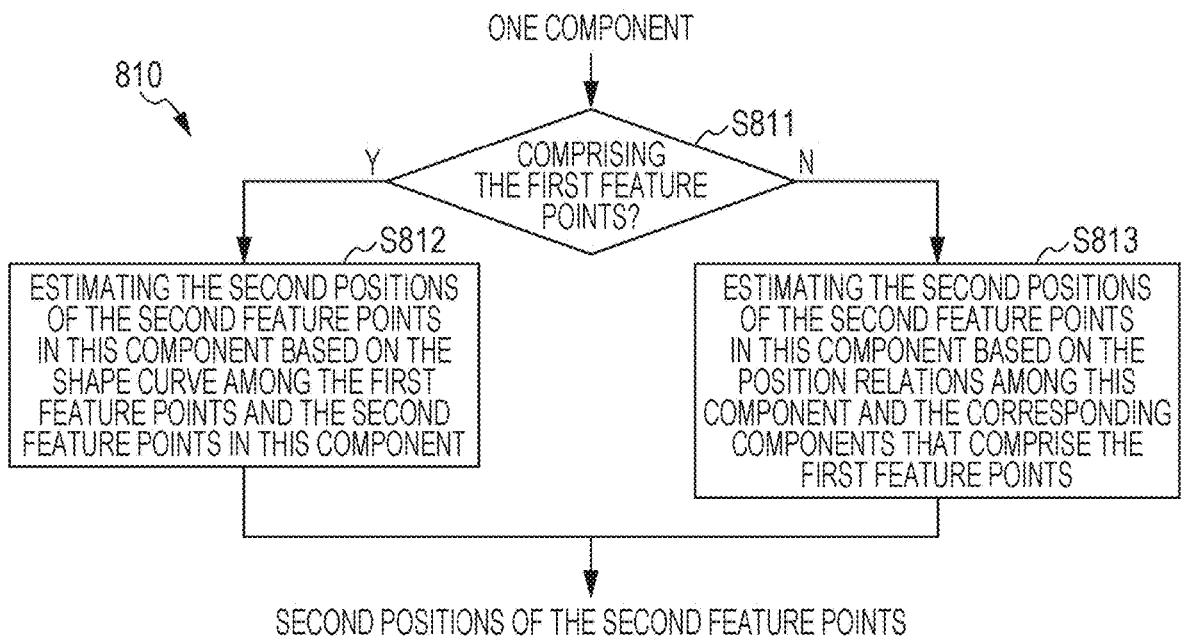
FIG. 9 is a flowchart schematically showing a detailed procedure of processing of the step S810 shown in FIG. 8.
Figure 10:
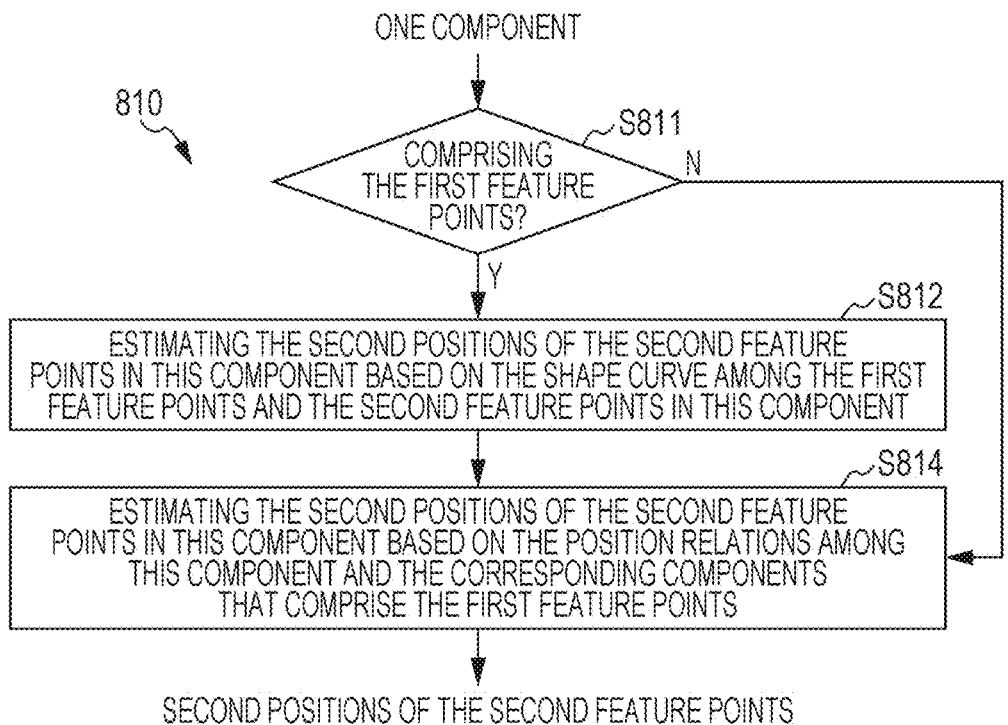
FIG. 10 is a flowchart schematically showing another detailed procedure of processing of the step S810 shown in FIG. 8.

Next, the detailed procedure of the second estimating step S810 will be described in the following. In order to obtain the more accurate second positions of the second feature points, in one implementation, the second estimating step S810 comprises a third estimating step S812 and a fourth estimating step S813/S814 which will be described in detail hereinafter. In one instance, in order to reduce the calculation complexity, the third estimating step S812 and the fourth estimating step S813 could be operated in a parallel manner as shown in FIG. 9. In another instance, in order to estimate the more accurate second positions of the second feature points in the components that do not comprise the first feature points, the third estimating step S812 could be operated first, and then the fourth estimating step S814 could be operated by using the output of the third estimating step S812 as shown in FIG. 10.

FIG. 9 is a flowchart schematically showing a detailed procedure of processing of the step S810 shown in FIG. 8. As shown in FIG. 9, first, in step S811, as for one component, the CPU 410 would judge whether this component comprises the first feature points. In case this component comprises the first feature points, the procedure will go to the third estimating step S812; otherwise, the procedure will go to the fourth estimating step S813.

In the third estimating step S812, as for the second feature points in this component that comprises the first feature points, the CPU 410 would estimate the second positions of these second feature points based on the shape curve among the first feature points and the second feature points in this component.

In one implementation, in order to reduce the calculation complexity, the third estimating step S812 comprises the following steps:

calculating a first center position of the first feature points according to the first positions of the first feature points in this component;

calculating a second center position of the first feature points according to the second positions of the first feature points in this component;

calculating first coordinate differences (such as $\Delta x1$ and $\Delta y1$) between the first center position and the second center position; and moving the first positions of the second feature points according to the first coordinate differences.

Figure 11A:
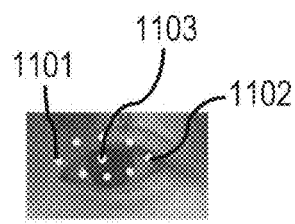
FIG. 11A schematically shows an example for estimating the second positions of the second feature points in an eye component through the step S812 shown in FIG. 9.
Figure 11B:
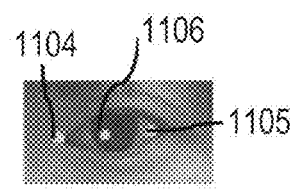
FIG. 11B schematically shows the example for estimating the second positions of the second feature points in an eye component through the step S812 shown in FIG. 9.
Figure 11C:
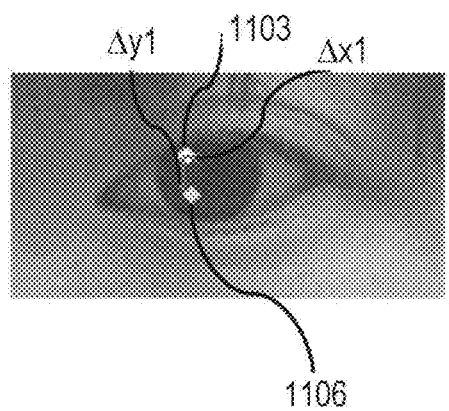
FIG. 11C schematically shows the example for estimating the second positions of the second feature points in an eye component through the step S812 shown in FIG. 9.
Figure 11D:
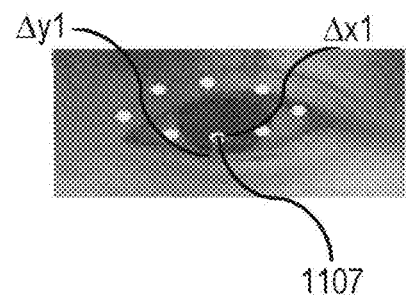
FIG. 11D schematically shows the example for estimating the second positions of the second feature points in an eye component through the step S812 shown in FIG. 9.
Figure 11E:
FIG. 11E schematically shows the example for estimating the second positions of the second feature points in an eye component through the step S812 shown in FIG. 9.

Taking an eye component that comprises two first feature points shown in FIG. 11A to 11E for example, the feature points shown in FIG. 11A are the feature points with the first positions acquired from the average shape of the face in the pre-generated first model for example. Wherein, the feature points 1101 and 1102 are the first feature points in this eye component, the point 1103 is the point with the first center position of the feature points 1101 and 1102 in this eye component, and the other feature points shown in FIG. 11A are the second feature points. As shown in FIG. 11B, the feature points 1104 and 1105 are the first feature points with the second positions in this eye component, and the point 1106 is the point with the second center position of the feature points 1104 and 1105 in this eye component. FIG. 11C schematically shows the calculated first coordinate differences $\Delta x1$ and $\Delta y1$ between the points 1103 and 1106. FIG. 11D schematically shows the operation for moving the first position of the second feature point 1107 according to the calculated first coordinate differences $\Delta x1$ and $\Delta y1$. And FIG. 11E shows the feature points with the estimated second positions.

In another implementation, in order to estimate the more accurate second positions of the second feature points in this component, the third estimating step S812 comprises the following steps:

acquiring the shape curve among the first feature points and the second feature points in this component from the pre-generated first model;

adjusting the shape curve according to the second positions of the first feature points in this components; and determining the second positions of the second feature points by dividing the adjusted shape curve in an equal length manner.

Now goes back to FIG. 9, in the fourth estimating step S813, as for the second feature points in this component that does not comprise the first feature points, the CPU 410 would estimate the second positions of these second feature points based on the position relations among this component and the corresponding components that comprise the first feature points.

In one implementation, in case there are two symmetrical components that comprise the first feature points and correspond to this component that does not comprise the first feature points, the fourth estimating step S813 comprises the following steps:

calculating a third center position of one of these two symmetrical components according to the first positions of the first feature points in this component, and calculating a fourth center position of this component according to the second positions of the first feature points in this component;

calculating a fifth center position of the other one of these two symmetrical components according to the first positions of the first feature points in this other component, and calculating a sixth center position of this other component according to the second positions of the first feature points in this other component;

calculating a seventh center position between the third center position and the fifth center position, and calculating an eighth center position between the fourth center position and the sixth center position;

calculating second coordinate differences (such as $\Delta x2$ and $\Delta y2$) between the seventh center position and the eighth center position; and moving the first positions of the second feature points in this component that does not comprise the first feature points according to the second coordinate differences.

In another implementation, in case there is one component that comprises the first feature points and corresponds to this component that does not comprise the first feature points, the fourth estimating step S813 comprises the following steps:

calculating a ninth center position of this component that comprises the first feature points according to the first positions of the first feature points in this component, and calculating a tenth center position of this component according to the second positions of the first feature points in this component;

calculating third coordinate differences (such as $\Delta x3$ and $\Delta y3$) between the ninth center position and the tenth center position; and moving the first positions of the second feature points in this component that does not comprise the first feature points according to the third coordinate differences.

As described above, another detailed procedure of processing of the step S810 shown in FIG. 8 is shown in FIG. 10. Comparing FIG. 10 with FIG. 9, the main difference is the operation of the fourth estimating step S813 and S814. In the fourth estimating step S813 shown in FIG. 9, the CPU 410 only uses the first and second positions of the first feature points in the components that comprise the first feature points to calculate the center positions. However, as described above, in order to estimate the more accurate second positions of the second feature points in the components that do not comprise the first feature points, the CPU 410 could further use the first and second positions of the second feature points in the components that comprise the first feature points to calculate the center positions, wherein the second positions of the second feature points in the components that comprise the first feature points are firstly estimated through the third estimating step S812 shown in FIG. 10. In addition, since the step S811 and the third estimating step S812 shown in FIG. 10 are the same as the corresponding steps S811 to S812 shown in FIG. 9, the detailed description would not be repeated herein.

As for the fourth estimating step S814 shown in FIG. 10, in one implementation, in case there are two symmetrical components that comprise the first feature points and correspond to this component that does not comprise the first feature points, the fourth estimating step S814 comprises the following steps:

calculating an eleventh center position of one of these two symmetrical components according to the first positions of the first feature points and the second feature points in this component, and calculating a twelfth center position of this component according to the second positions of the first feature points and the second feature points in this component;

calculating a thirteenth center position of the other one of these symmetrical components according to the first positions of the first feature points and the second feature points in this other component, and calculating a fourteenth center position of this other component according to the second positions of the first feature points and the second feature points in this other component;

calculating a fifteenth center position between the eleventh center position and the thirteenth center position, and calculating a sixteenth center position between the twelfth center position and the fourteenth center position;

calculating fourth coordinate differences (such as $\Delta x4$ and $\Delta y4$) between the fifteenth center position and the sixteenth center position; and moving the first positions of the second feature points in this component that does not comprise the first feature points according to the fourth coordinate differences.

Figure 12A:
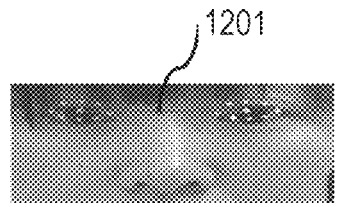
FIG. 12A schematically shows an example for estimating the second positions of the second feature points in a nose component through the step S814 shown in FIG. 10.
Figure 12B:
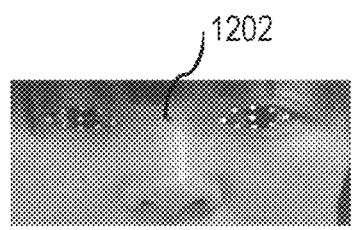
FIG. 12B schematically shows the example for estimating the second positions of the second feature points in a nose component through the step S814 shown in FIG. 10.
Figure 12C:
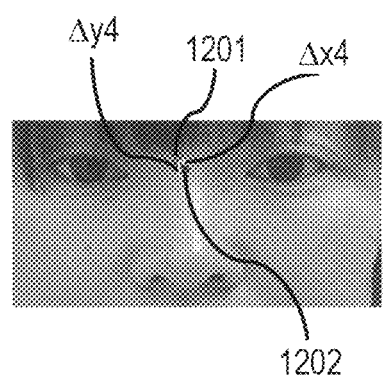
FIG. 12C schematically shows the example for estimating the second positions of the second feature points in a nose component through the step S814 shown in FIG. 10.
Figure 12D:
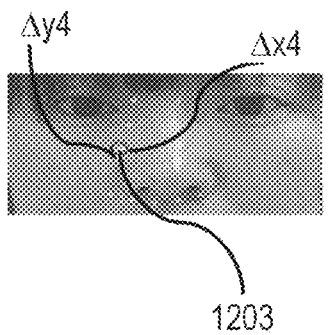
FIG. 12D schematically shows the example for estimating the second positions of the second feature points in a nose component through the step S814 shown in FIG. 10.
Figure 12E:
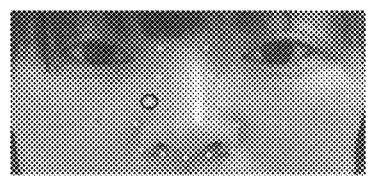
FIG. 12E schematically shows the example for estimating the second positions of the second feature points in a nose component through the step S814 shown in FIG. 10.

Taking the two symmetrical eye components that comprise two first feature points and the nose component that does not comprise the first feature points shown in FIG. 12A to 12E for example. The feature points shown in FIG. 12A are the feature points with the first positions acquired from the average shape of the face in the pre-generated first model for example. Wherein, the feature points with the trigonometric shapes are the first feature points of the eye components, and the point 1201 is the point with the fifteenth center position calculated according to the center position (such as the eleventh center position) of the left eye component and the center position (such as the thirteenth center position) of the right eye component. The feature points shown in FIG. 12B are the feature points with the second positions estimated through the third estimating step S812 shown in FIG. 10 for example. Wherein, the feature points with the trigonometric shapes are the first feature points of the eye components, and the point 1202 is the point with the sixteenth center position calculated according to the center position (such as the twelfth center position) of the left eye component and the center position (such as the fourteenth center position) of the right eye component. FIG. 12C schematically shows the calculated fourth coordinate differences $\Delta x4$ and $\Delta y4$ between the points 1201 and 1202. FIG. 12D schematically shows the operation for moving the first position of the second feature point 1203 in the nose component according to the calculated fourth coordinate differences $\Delta x4$ and $\Delta y4$. And FIG. 12E shows the feature points with the estimated second positions in the nose component.

As for the fourth estimating step S814 shown in FIG. 10, in another implementation, in case there is one component that comprises the first feature points and corresponds to this component that does not comprise the first feature points, the fourth estimating step S814 comprises the following steps:

calculating a seventeenth center position of this component that comprises the first feature points according to the first positions of the first feature points and the second feature points in this component, and calculating an eighteenth center position of this component according to the second positions of the first feature points and the second feature points in this component;

calculating fifth coordinate differences (such as $\Delta x5$ and $\Delta y5$) between the seventeenth center position and the eighteenth center position; and moving the first positions of the second feature points in this component that does not comprise the first feature points according to the fifth coordinate differences.

In this second embodiment, the present invention not only estimates the more accurate positions (i.e. the second positions) for the first feature points, but also estimates the more accurate positions (i.e. the second positions) for the second feature points in each component by using the more accurate positions of the first feature points, the position relations among the feature points used to describe the face shape (such as the shape curve relation among the feature points in one component and the position relations among the components). And then the present invention detects the final face shape of the face by using the estimated more accurate positions of the first feature points and the second feature points. Since the present invention estimates the second positions for the first feature points firstly, and then estimates the second positions for the second feature points in each component respectively, the calculation complexity of the present invention could be reduced. Furthermore, since the position relations used to estimate the second positions of the second feature points are invariable regardless which kind of situation the face images are captured in, the estimated second positions of the second feature points could be more approaching to the actual position of the face. Therefore, the final detected face shape could be more accurate. That is to say, the final detected face shape could approach to the actual face shape much more.

[Second and Third Models Generating)

As described above, the second models used in the first estimating step S530 and the third models used in the feature point detection step S540 shown in FIG. 5 could be the regression models. In order to generate the corresponding models that could be used in the present invention, the manufacture could generate the second models and the third models from the plurality of the sample images by using the generating method with reference to FIG. 13 or FIG. 14 in advance. The generating method with reference to FIG. 13 and FIG. 14 also could be executed by the hardware configuration 400 shown in FIG. 4.

Figure 13:
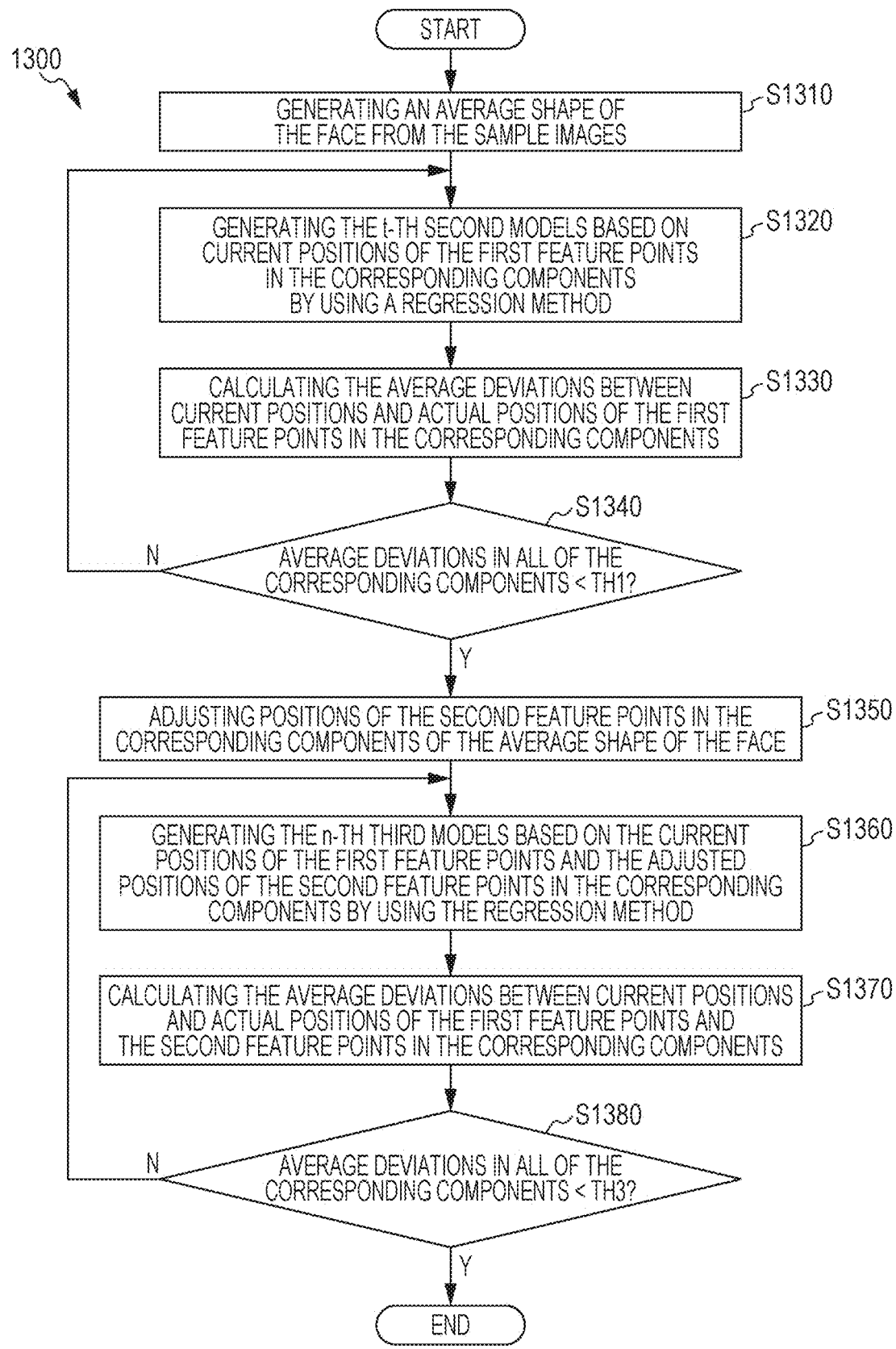
FIG. 13 is a flowchart schematically showing a generating method for generating the second models used in the step S530 and the third models used in the step S540 shown in FIG. 5.

FIG. 13 is a flowchart 1300 schematically showing a generating method for generating the second models used in the step S530 and the third models used in the step S540 shown in FIG. 5.

As shown in FIG. 13, first, the CPU 410 as shown in FIG. 4 would acquire a plurality of sample images input by the manufacture through the Input Device 450, wherein in each sample image, the first feature points and the second feature points are labelled out in the corresponding components manually by the manufacture according to the experience or prior knowledge. And then, in step S1310, the CPU 410 would generate, from the plurality of sample images, an average shape of the face, shape curves among the first feature points and the second feature points in the corresponding components, and position relations among the components. Wherein, the detailed operation of the step S1310 is similar with the above-mentioned operation for generating the pre-generated first model, thus the detailed description would not be repeated herein.

In step S1320, the CPU 410 would generate, from the plurality of the sample images, the t-th second model based on current positions of the first feature points in the corresponding components by using the existing regression methods, such as L1-norm regularized linear regression method, the ESR algorithm or the SDM algorithm. Wherein the 1st second model is generated based on the positions of the first feature points in the corresponding components of the average shape of the face. In this step, the second models are generated only by using the features around the first feature points, thus the model size of the second models generated by using the present invention will be reduced. Wherein, the used features could be the above-mentioned SIFT features, the SURF features or the HOG features for example.

In step S1330, the CPU 410 would calculate the average deviations between current positions and actual positions of the first feature points in the corresponding components. And in step S1340, the CPU 410 would judge whether the calculated average deviations in all of the corresponding components are less than the above-mentioned first threshold (TH1) or not. In case the CPU 410 judges that the calculated average deviations in all of the corresponding components are less than TH1, the process will go to step S1350. Otherwise, the process will go back to the step S1320 to continue generating the subsequence second models. Wherein, the subsequence second models are only generated based on the first feature points in the components in which the average deviations between the current positions and the actual positions of the first feature points are larger than or equal to TH1. That is to say, the first feature points in the components in which the average deviations between the current positions and the actual positions of the first feature points are less than TH1 will not be used to generate the subsequence second models. Thus, the model size of the second models generated by using the present invention could be further reduced.

In step S1350, after the calculated average deviations in all of the corresponding components are less than TH1, the CPU 410 would adjust positions of the second feature points in the corresponding components of the average shape of the face based on the current positions of the first feature points, the shape curves among the first feature points and the second feature points in the corresponding components, and the position relations among the components. Wherein, the detailed operation of the step S1350 is similar with the above-mentioned operation of the second estimating step S810 shown in FIG. 8, thus the detailed description would not be repeated herein.

And then, in step S1360, the CPU 410 would generate, from the plurality of the sample images, the third models based on the current positions of the first feature points and the adjusted positions of the second feature points in the corresponding components by using the above-mentioned regression method, such as the L1-norm regularized linear regression method, the ESR algorithm or the SDM algorithm. In this step, the third models are generated by using the features around the first feature points and the second feature points with the more accurate, positions, thus the accuracy of the third models generated by using the present invention will be increased. Wherein, the used features also could be the above-mentioned SIFT features, the SURF features or the HOG features for example.

In step S1370, the CPU 410 would calculate the average deviations between the current positions and the actual positions of the first feature points in the corresponding components and average deviations between current positions and actual positions of the second feature points in the corresponding components. And in step S1380, the CPU 410 would judge whether the calculated average deviations in all of the corresponding components are less than a third threshold (TH3) or not, wherein the TH3 could be pre-defined by the manufacture according to the experience or prior knowledge. In case the CPU 410 judges that the calculated average, deviations in all of the corresponding components are less than TH3, the process completes and will output the second models and the third models. Otherwise, the process will go back to the step S1360 to continue generating the subsequence third models. Wherein, the subsequence third models are only generated based on the first feature points and the second feature points in the components in which the average deviations between the current positions and the actual positions of the first feature points or the average deviations between the current positions and the actual positions of the second feature points are larger than or equal to TH3. That is to say, the first feature points and the second feature points in the components in which the average deviations between the current positions and the actual positions of the first feature points and the average deviations between the current positions and the actual positions of the second feature points are both less than TH3 will not be used to generate the subsequence third models. Thus, the model size of the third models generated by using the present invention could be reduced.

As described above, the steps S1350 to S1380 are began to operate after the CPU 410 judges that the calculated average deviations in all of the corresponding components are less than TH1 in the step S1340. That is to say, in this situation, the second models and the third models are generated for the whole face. However, as an optional solution, the steps S1350 to S1380 could be began to operate as long as the CPU 410 judges that the average deviation in one component is less than TH1 in the step S1340. Thus, in this situation, the second models and the third models are generated for each of components respectively.

Figure 14:
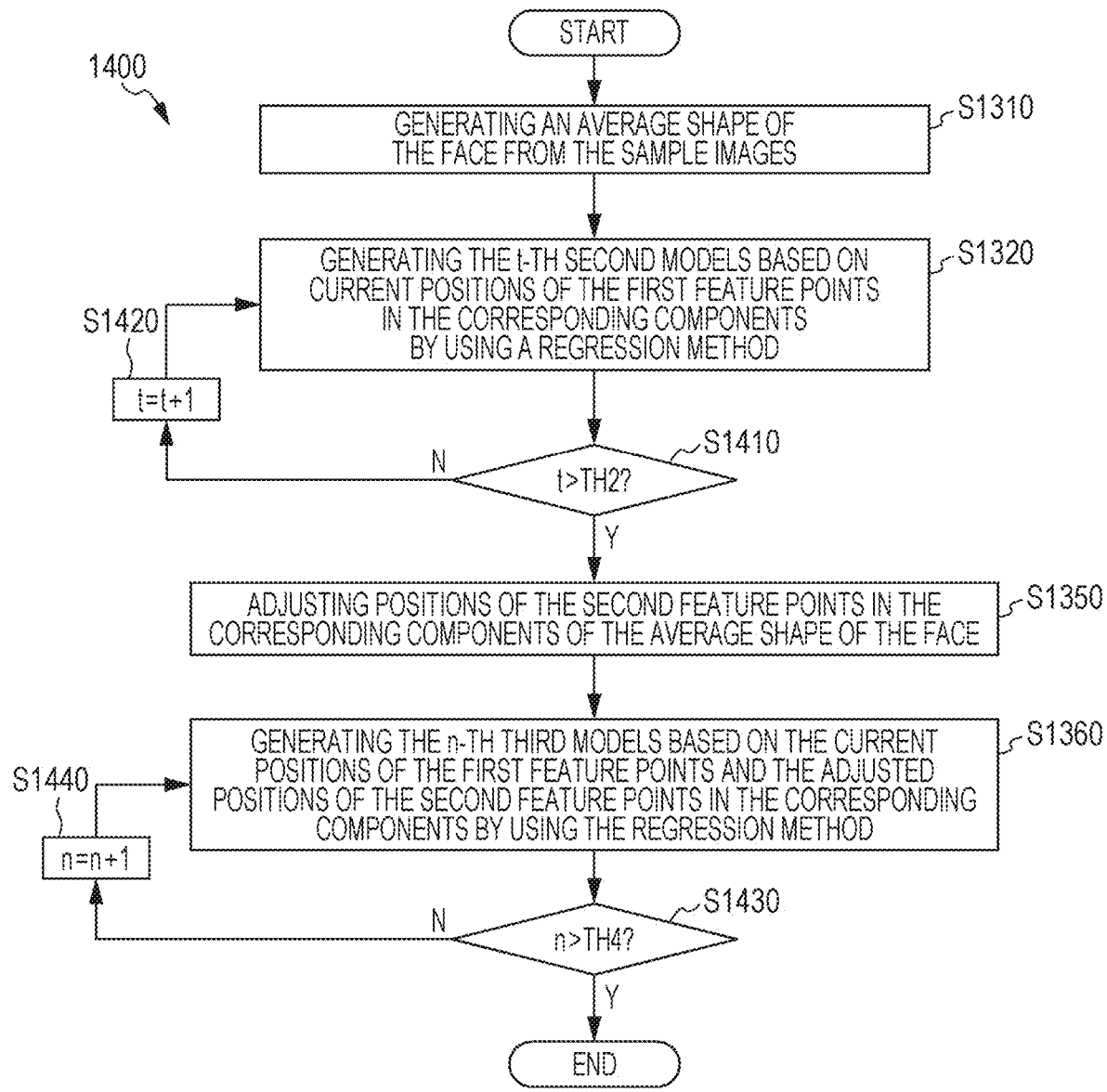
FIG. 14 is a flowchart schematically showing another generating method for generating the second models used in the step S530 and the third models used in the step S540 shown in FIG. 5.

FIG. 14 is a flowchart 1400 schematically showing another generating method for generating the second models used in the step S530 and the third models used in the step S540 shown in FIG. 5.

Comparing FIG. 14 with FIG. 13, there are two main differences in the flowchart 1400 shown in FIG. 14:

First, after the CPU 410 generates the t-th second model in the step S1320, instead of calculating the average deviation, the CPU 410 would judge whether t is larger than a second threshold (TH2) in step S1410. Wherein, t represents current cascaded number of the second models that have been generated in the step S1320. And TH2 could be predefined by the manufacture according to the experience or prior knowledge, for example, TH2 is the above-mentioned T which is described in the step S535 shown in FIG. 6 and represents the total cascaded number of the second models. In case that t is less than or equal to the TH2, the CPU 410 would set t=t+1 in step S1420 and would continue generating the subsequence second models in the step S1320. In case that t is larger than the TH2, the CPU 410 would execute the corresponding operation in the step S1350.

Second, after the CPU 410 generates the n-th third model in the step S1360, instead of calculating the average deviation, the CPU 410 would judge whether n is larger than a fourth threshold (TH4) in step S1430. Wherein, n represents current cascaded number of the third models that have been generated in the step S1360. And TH4 could be predefined by the manufacture according to the experience or prior knowledge, for example, TH4 is the above-mentioned N which is described in the step S545 shown in FIG. 7 and represents the total cascaded number of the third models. In case that n is less than or equal to the TH4, the CPU 410 would set n=n+1 in step S1440 and would continue generating the subsequence third models in the step S1360. In case that n is larger than the TH4, the process completes and will output the second models and the third models.

In addition, since the steps S1310, S1320, S1350 and S1360 shown in FIG. 14 are the same as the corresponding steps S1310, S1320, S1350 and S1360 shown in FIG. 13, the detailed description would not be repeated herein.

Configuration of Feature Point Detection Apparatus

Figure 15:
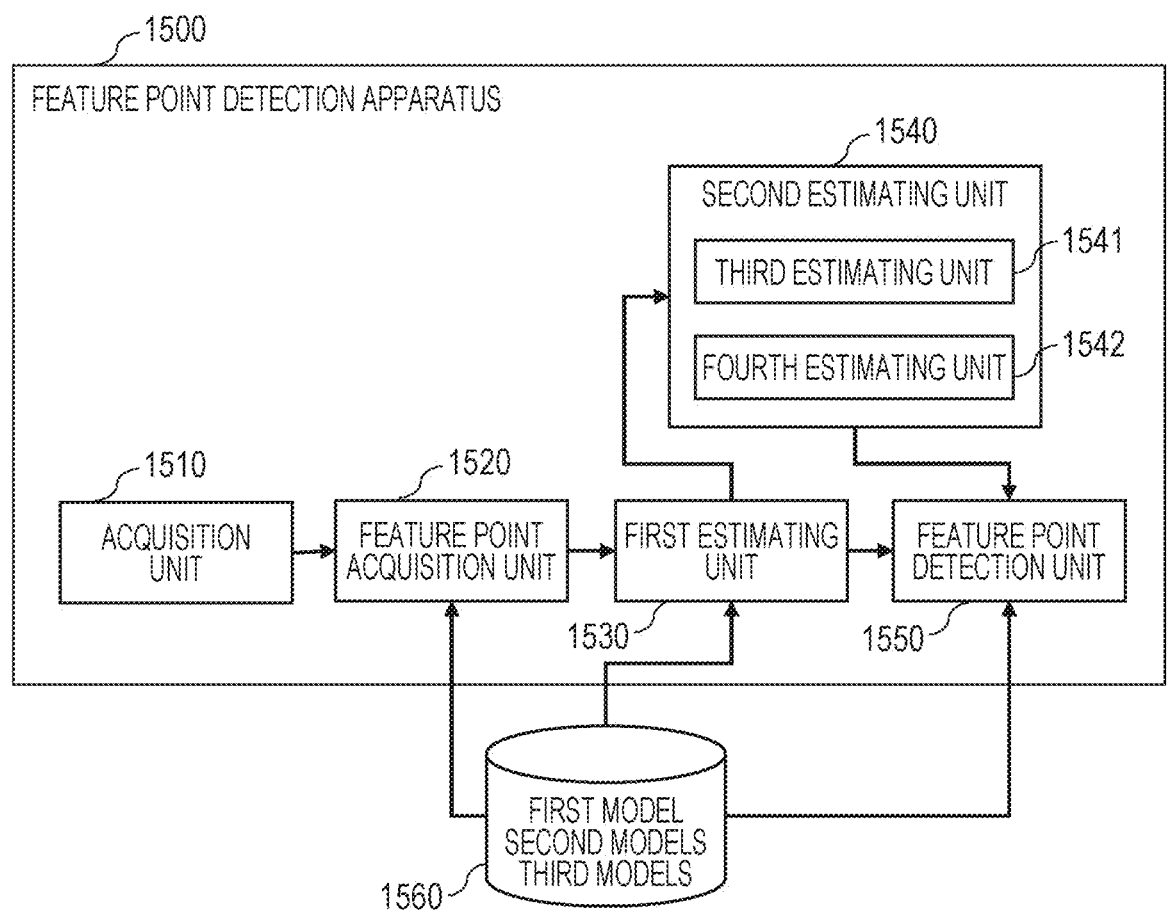
FIG. 15 is a block diagram illustrating the configuration of the feature point detection apparatus 1500 according to the embodiments of the present invention.

The configuration for feature point detection will be described next with reference to FIG. 15. FIG. 15 is a block diagram illustrating the configuration of the feature point detection apparatus 1500 according to the embodiments of the present invention.

The blocks shown in FIG. 15 are implemented as the CPU 410 that is described above with reference of FIG. 4 and used for executing programs loaded to the RAM 420 and for cooperating with each of the hardware shown in FIG. 4. Some or all of the blocks could be implemented by dedicated hardware.

As shown in FIG. 15, as for the first embodiment of the present invention described with reference to FIG. 5, the feature point detection apparatus 1500 at least comprises: an acquisition unit 1510, a feature point acquisition unit 1520, a first estimating unit 1530 and a feature point detection unit 1550. And further, as for the second embodiment of the present invention described with reference to FIG. 8, the feature point detection apparatus 1500 further comprises a second estimating unit 1540. Wherein, a storage device 1560 shown in FIG. 15 could be the ROM 430 or the Hard Disk 440 shown in FIG. 4 and could store the above-mentioned first model, second models and third models. Alternatively, the storage device 1560 also could be the Sever or external storage device connected with the feature point detection apparatus 1500 via the network (not shown).

First, as described above, the Input Device 450 shown in FIG. 4 would acquire one image which is output from the special electronic device (such as the digital camera) or is input by the user. Wherein, the acquired image is a face image with a face region and the acquired image is a normalized face image that is normalized by the existing normalization methods. Second, the Input Device 450 would transfer the acquired image to the acquisition unit 1510 via the system bus 480.

And then, as shown in FIG. 15, the acquisition unit 1510 would acquire the acquired image from the Input Device 450 through the system bus 480 and acquire the face region in the acquired image (corresponding to the step S510 shown in FIG. 5 or FIG. 8).

The feature, point acquisition unit 1520 would acquire first positions of first feature points and second feature points in corresponding components of the face according to a pre-generated first model stored in the storage device 1560, wherein at least one of the components comprises the first feature, points and the first feature points are feature points whose average deviations of feature changing in the corresponding components are less than a first threshold (TH1) (corresponding to the step S520 shown in FIG. 5 or FIG. 8).

The first estimating unit 1530 would estimate second positions of the first feature points in the corresponding components according to the first positions of the first feature points and at least one pre-generated second model stored in the storage device 1560 (corresponding to the step S530 shown in FIG. 5 or FIG. 8).

And then, as for the first embodiment described above, the feature point detection unit 1550 would detect third positions of the first feature points and the second feature points in the corresponding components according to the second positions of the first feature points, the first positions of the second feature points and at least one pre-generated third model stored in the storage device 1560 (corresponding to the step S540 shown in FIG. 5).

Furthermore, as for the second embodiment described above, after the first estimating unit 1530 estimates the second positions of the first feature points in the corresponding components, the second estimating unit 1540 would estimate second positions of second feature points in the corresponding components according to the first positions of the second feature points, the first positions of the first feature points and the second positions of the first feature points (corresponding to the step S810 shown in FIG. 8). And then, the feature point detection unit 1550 would detect the third positions of the first feature points and the second feature points in the corresponding components according to the second positions of the first feature points and the second feature points and at least one pre-generated third model stored in the storage device 1560 (corresponding to the step S820 shown in FIG. 8).

In one implementation, the second estimating unit 1540 comprises a third estimating unit 1541 and a fourth estimating unit 1542. Wherein, the third estimating unit 1541 is configured to, as for the second feature points in one component that comprises the first feature points, estimate the second positions of these second feature points based on the shape curve among the first feature points and the second feature points in this component (corresponding to the step S812 shown in FIG. 9 or FIG. 10). And the fourth estimating unit 1542 is configured to, as for the second feature points in one component that does not comprise the first feature points, estimate the second positions of these second feature points based on the position relations among this component and the corresponding components that comprise the first feature points (corresponding to the step S813 shown in FIG. 9 or the step S814 shown in FIG. 10).

The respective units in the feature point detection apparatus 1500 can be configured to perform the respective steps shown in the flowcharts in FIG. 5 to FIG. 12E.

Image Processing System

Figure 16:
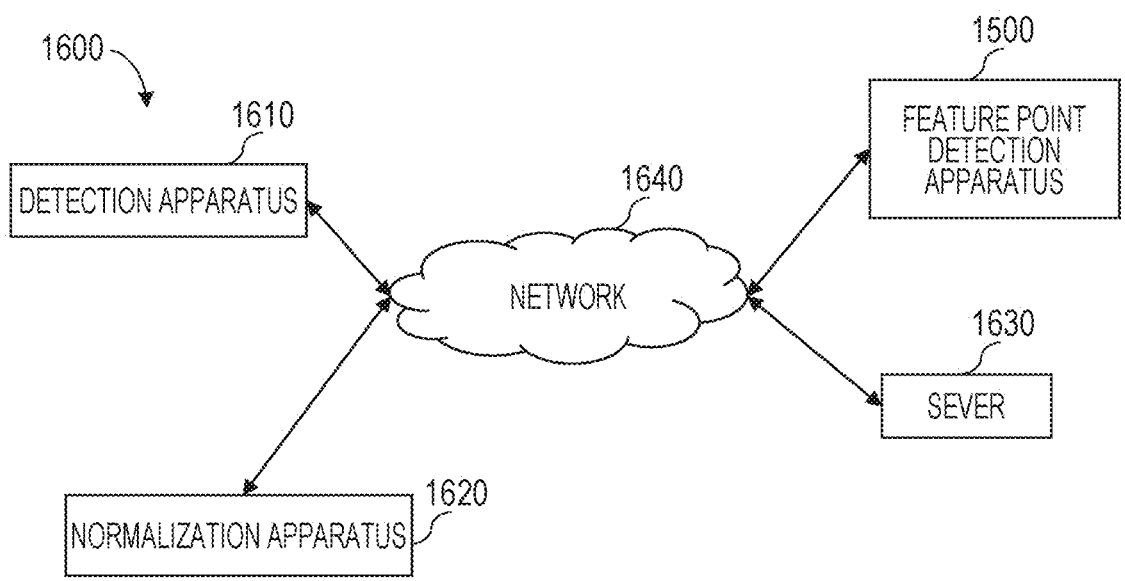
FIG. 16 illustrates the arrangement of an exemplary image processing system according to the present invention.

In the above-mentioned embodiments, the image acquired b the acquisition step S510 shown in FIG. 5 or FIG. 8 or the image acquired by the acquisition unit 1510 shown in FIG. 15 is a face image with a face region and the acquired image is a normalized face image. That is to say, in the above-mentioned embodiments, it is assumed that the face region has been detected from the face image and the corresponding face image has been normalized. However, generally, the face image output from a special electronic device (such as a digital camera) or input by the user is an image in which the face region has not been detected yet and also is an image that has not been normalized yet. Therefore, as an exemplary application of the above-mentioned feature point detection, an exemplary image processing system will be described next with reference to FIG. 16. FIG. 16 illustrates the arrangement of an exemplary image processing system 1600 according to the present invention.

As shown in FIG. 16, the image processing system 1600 according to the present invention comprises a detection apparatus 1610, a normalization apparatus 1620, the above-mentioned feature point detection apparatus 1500 and a sever 1630. Wherein, the detection apparatus 1610, the normalization apparatus 1620, the feature point detection apparatus 1500 and the sever 1630 are connected with each other via network 1640. And the network 1640 may provide a data transfer path for transferring data to, from, or between the detection apparatus 1610, the normalization apparatus 1620, the feature point detection apparatus 1500, the sever 1630 and the like to each other. In addition, a system bus (not shown) could be used to replace the network 1640. Furthermore, the sever 1630 could be used as the above-mentioned storage device 1560 shown in FIG. 15.

First, the detection apparatus 1610 would receive an image output from a special electronic device (such as a digital camera) or input by the user. And then the detection apparatus 1610 would detect a face region from the received image by using the pre-generated face detectors for example. Wherein, the pre-generated face detectors also could be stored in the sever 1630. The detected face region includes four points (i.e. the left-top point, the left-bottom point, the right-top point and the right-bottom point) that could represent the face position on the received image for example.

Second, the normalization apparatus 1620 would normalize the image corresponding to the detected face region by using the existing normalization methods, such as affine transformation algorithm. Through the normalization operation, rotation angle of the face on the received image will be eliminated and size of the face in the normalized face region will have the same size of the face in the pre-generated first model.

Finally, the feature point detection apparatus 1500 would detect feature points in corresponding components of the face from the normalized face region according to the above-mentioned description with reference of FIG. 5 to FIG. 12E.

Monitoring System

Figure 17:
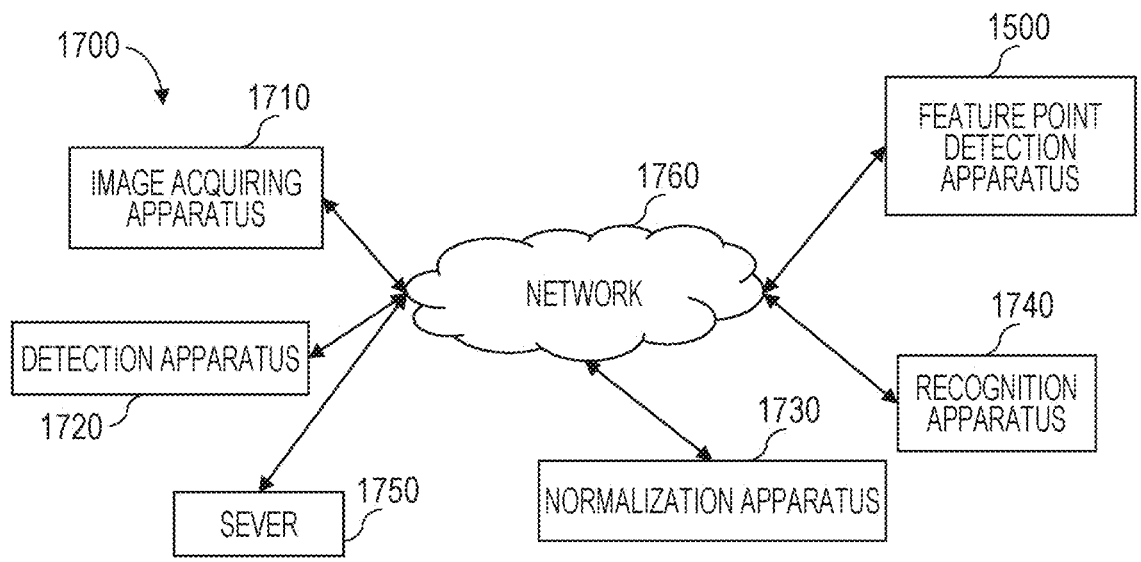
FIG. 17 illustrates the arrangement of an exemplary monitoring system according to the present invention.

As described above, the feature point detection results (i.e. the detected feature points) output from the feature point detection apparatus 1500 shown in FIG. 15 could be used for face recognition. Therefore, as an exemplary application of the above-mentioned feature point detection, an exemplary monitoring system will be described next with reference to FIG. 17. FIG. 17 illustrates the arrangement of an exemplary monitoring system 1700 according to the present invention.

As shown in FIG. 17, the monitoring system 1700 according to the present invention comprises at least one image acquiring apparatus 1710 (such as the digital cameras), a detection apparatus 1720, a normalization apparatus 1730, the above-mentioned feature point detection apparatus 1500, a recognition apparatus 1740 and a sever 1750. Wherein, the image acquiring apparatuses 1710, the detection apparatus 1720, the normalization apparatus 1730, the feature point detection apparatus 1500, the recognition apparatus 1740 and the sever 1750 are connected with each other via network 1760. And the network 1760 may provide a data transfer path for transferring data to, from, or between the image acquiring apparatuses 1710, the detection apparatus 1720, the normalization apparatus 1730, the feature point detection apparatus 1500, the recognition apparatus 1740, the sever 1750 and the like to each other. In addition, a system bus (not shown) could be used to replace the network 1760. Furthermore, the sever 1750 could be used as the above-mentioned storage device 1560 shown in FIG. 15.

As for a special monitoring region, first, the image acquiring apparatuses 1710 would capture/acquire images timely.

And then, similar to the detection apparatus 1610 shown in FIG. 16, as for one acquired image, the detection apparatus 1720 would detect a face region from the acquired image by using the pre-generated face detectors for example. Wherein, the pre-generated face detectors also could be stored in the sever 1750.

Similar to the normalization apparatus 1620, the normalization apparatus 1730 would normalize the image corresponding to the detected face region by using the existing normalization methods, such as affine transformation algorithm.

And then, the feature point detection apparatus 1500 would detect feature points in corresponding components of the face from the normalized face region according to the above-mentioned description with reference of FIG. 5 to FIG. 12E.

And finally, the recognition apparatus 1740 would recognize the face according to the detected feature points by using the pre-generated face models for example. Wherein, the pre-generated face models also could be stored in the sever 1750.

As described above, the final detected face shape could approach to the actual face shape much more by using the present invention. That is to say, positions of the final detected feature points could approach to the actual position of the face much more. Thus, the accuracy of the face recognition in the above-mentioned monitoring system could be improved by using the more accurate positions of the feature points.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

Furthermore, in case the feature point detection apparatus 1500 shown in FIG. 15 that is constituted of various units is partially or totally configured by software, it could be stored in the Hard Disk 440 shown in FIG. 4. In another aspect, in case the feature point detection apparatus 1500 shown in FIG. 15 is partially or totally configured by hardware or firmware, it could also be incorporated into an electronic device, as a functional module, as long as there is a need for feature point detection processing in the electronic device.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Chinese Patent Application No. 201610127580.X, filed Mar. 7, 2016, which is hereby incorporated by reference herein in its entirety.

The invention claimed is:

1. A method for a feature point detection apparatus, the method comprising:

acquiring a face region of a face in an input image;

detecting first positions of first feature points and second feature points in corresponding components of the face according to a pre-generated first model, wherein at least one of the components of the face includes the first feature points, and wherein the first feature points are feature points whose average deviations of feature changing in the corresponding components are less than a first threshold;

estimating, as a first estimating, second positions of the first feature points in the corresponding components according to the first positions of the first feature points and at least one pre-generated second model; and updating the first positions of the first feature points and the second feature points to third positions of the first feature points and the second feature points in the corresponding components according to the second positions of the first feature points, the first positions of the second feature points, and at least one pre-generated third model.

2. The method according to claim 1, the method further comprising estimating, as a second estimating, second positions of the second feature points in the corresponding components according to the first positions of the second feature points, the first positions of the first feature points, and the second positions of the first feature points, wherein, updating includes updating the first positions of the first feature points and the second feature points to the third positions of the first feature points and the second feature points in the corresponding components according to the second positions of the first feature points, the second feature points, and the at least one pre-generated third model.

3. The method according to claim 2, wherein the pre-generated first model includes shape curves among the first feature points and the second feature points in the corresponding components, position relations among the components of the face, and an average shape of the face in which the first feature points and the second feature points are labelled out in the corresponding components.

4. The method according to claim 3, wherein the second estimating includes:

estimating, as a third estimating and as for the second feature points in one component that includes the first feature points, the second positions of these second feature points based on a shape curve among the first feature points and the second feature points in the one component, and estimating, as a fourth estimating and as for the second feature points in one component that does not include the first feature points, the second positions of these second feature points based on the position relations among the one component and the corresponding components that include the first feature points.

5. The method according to claim 4, wherein the third estimating includes:

calculating a first center position of the first feature points according to the first positions of the first feature points in the one component, calculating a second center position of the first feature points according to the second positions of the first feature points in the one component, calculating first coordinate differences between the first center position and the second center position, and moving the first positions of the second feature points according to the first coordinate differences.

6. The method according to claim 4, wherein the third estimating includes:

acquiring the shape curve among the first feature points and the second feature points in the one component from the pre-generated first model, adjusting the shape curve according to the second positions of the first feature points in the one components, and determining the second positions of the second feature points by dividing the adjusted shape curve in an equal length manner.

7. The method according to claim 4, wherein, in a case where two symmetrical components include the first feature points, the fourth estimating includes:

calculating a third center position of one component that includes the first feature points according to the first positions of the first feature points in the one component, and calculating a fourth center position of the one component according to the second positions of the first feature points in the one component, calculating a fifth center position of the other component that includes the first feature points according to the first positions of the first feature points in the one component, and calculating a sixth center position of the one component according to the second positions of the first feature points in the one component, calculating a seventh center position between the third center position and the fifth center position, and calculating an eighth center position between the fourth center position and the sixth center position, calculating second coordinate differences between the seventh center position and the eighth center position, and moving the first positions of the second feature points in the one component that does not include the first feature points according to the second coordinate differences.

8. The method according to claim 4, wherein, in a case where one component includes the first feature points, the fourth estimating includes:

calculating a ninth center position of the one component that includes the first feature points according to the first positions of the first feature points in the one component, and calculating a tenth center position of the one component according to the second positions of the first feature points in the one component, calculating third coordinate differences between the ninth center position and the tenth center position, and moving the first positions of the second feature points in the one component that does not include the first feature points according to the third coordinate differences.

9. The method according to claim 4, wherein, in a case where two symmetrical components include the first feature points, the fourth estimating includes:

calculating an eleventh center position of one component that includes the first feature points according to the first positions of the first feature points and the second feature points in the one component, and calculating a twelfth center position of the one component according to the second positions of the first feature points and the second feature points in the one component, calculating a thirteenth center position of the other component that includes the first feature points according to the first positions of the first feature points and the second feature points in the one component, and calculating a fourteenth center position of the one component according to the second positions of the first feature points and the second feature points in the one component, calculating a fifteenth center position between the eleventh center position and the thirteenth center position, and calculating a sixteenth center position between the twelfth center position and the fourteenth center position, calculating fourth coordinate differences between the fifteenth center position and the sixteenth center position, and moving the first positions of the second feature points in the one component that does not include the first feature points according to the fourth coordinate differences.

10. The method according to claim 4, wherein, in a case where one component includes the first feature points, the fourth estimating includes:

calculating a seventeenth center position of the one component that includes the first feature points according to the first positions of the first feature points and the second feature points in the one component, and calculating an eighteenth center position of the one component according to the second positions of the first feature points and the second feature points in the one component, calculating fifth coordinate differences between the seventeenth center position and the eighteenth center position, and moving the first positions of the second feature points in the one component that does not include the first feature points according to the fifth coordinate differences.

11. The method according to claim 2, wherein the at least one pre-generated second model and the at least one pre-generated third model are regression models which are generated by the following:

generating, from a plurality of sample images, an average shape of the face in which the first feature points and the second feature points are labelled out in the corresponding components, shape curves among the first feature points and the second feature points in the corresponding components, and position relations among the components of the face, generating, from the plurality of the sample images, the at least one pre-generated second model based on positions of the first feature points in the corresponding components of the average shape of the face by using a regression method, until the average deviations between current positions and actual positions of the first feature points in the corresponding components are less than the first threshold, or cascaded number of the at least one pre-generated second model is larger than or equal to a second threshold, adjusting positions of the second feature points in the corresponding components of the average shape of the face based on the current positions of the first feature points, the shape curves among the first feature points and the second feature points in the corresponding components, and the position relations among the components of the face, and generating, from the plurality of the sample images, the at least one pre-generated third model based on the current positions of the first feature points and the adjusted positions of the second feature points in the corresponding components by using the regression method, until the average deviations between the current positions and the actual positions of the first feature points and the second feature points in the corresponding components and average deviations between current positions and actual positions of the second feature points in the corresponding components are less than a third threshold, or cascaded number of the at least one pre-generated third model is larger than or equal to a fourth threshold.

12. The method according to claim 11, wherein in generating the at least one pre-generated second model in a case where the average deviations between the current positions and the actual positions of the first feature points in one component are less than the first threshold in a current at least one pre-generated second model, subsequence at least one pre-generated second models are generated based on the first feature points in other corresponding components in which the average deviations between the current positions and the actual positions of the first feature points are larger than or equal to the first threshold.

13. The method according to claim 11, wherein generating the at least one pre-generated third model in a case where the average deviations between the current positions and the actual positions of the first feature points in one components and the average deviations between the current positions and the actual positions of the second feature points in this component are both less than the third threshold in a current at least one pre-generated third model, subsequence at least one pre-generated third models are generated based on the first feature points and the second feature points in other components in which the average deviations between the current positions and the actual positions of the first feature points or the average deviations between the current positions and the actual positions of the second feature points are larger than or equal to the third threshold.

14. The method according to claim 2, wherein, as for one pre-generated third model of the at least one pre-generated third model, updating includes:
    extracting features from corresponding regions that contain the first feature points with the second positions and corresponding regions that contain the second feature points with the second positions,
    calculating corresponding position increments for the second positions of the first feature points and the second feature points according to this one pre-generated third model and the extracted features, and
    updating the second positions of the first feature points and the second feature points to the third positions by adding the corresponding position increments to the second positions of the corresponding first feature points and the corresponding second feature points.

15. The method according to claim 1, wherein, as for one pre-generated second model of the at least one pre-generated second model, the first estimating include:
    extracting features from corresponding regions that contain the first feature points with the first positions,
    calculating corresponding position increments for the first positions of the first feature points according to this one pre-generated second model and the extracted features, and
    updating the first positions of the first feature points by adding the corresponding position increments to the first positions of the corresponding first feature points.

16. The method according to claim 1, wherein, as for one pre-generated third model of the at least one pre-generated third model, updating includes:
    extracting features from corresponding regions that contain the first feature points with the second positions and corresponding regions that contain the second feature points with the first positions,
    calculating corresponding position increments for the second positions of the first feature points and the first positions of the second feature points according to this one pre-generated third model and the extracted features, and
    updating the second positions of the first feature points and the first positions of the second feature points to the third positions by adding the corresponding position increments to the second positions of the corresponding first feature points and to the first positions of the corresponding second feature points.

17. A feature point detection apparatus comprising:
at least one processor; and
at least one memory coupled to the at least one processor, the memory having stored thereon instructions which, when executed by the at least one processor, cause the feature point detection apparatus to perform operations including:
acquiring, as an acquisition, a face region of a face in an input image;
detecting, as a detection, first positions of first feature points and second feature points in corresponding components of the face according to a pre-generated first model, wherein at least one of the components of the face includes the first feature points, and wherein the first feature points are feature points whose average deviations of feature changing in the corresponding components are less than a first threshold;
estimating, as a first estimation, second positions of the first feature points in the corresponding components according to the first positions of the first feature points and at least one pre-generated second model; and
updating, as an update, the first positions of the first feature points and the second feature points to third positions of the first feature points and the second feature points in the corresponding components according to the second positions of the first feature points, the first positions of the second feature points, and at least one pre-generated third model.

18. The feature point detection apparatus according to claim 17, further comprising:
    estimating, as a second estimation, second positions of the second feature points in the corresponding components according to the first positions of the second feature points, the first positions of the first feature points, and the second positions of the first feature points,
    wherein, the update updates the first positions of the first feature points and the second feature points to the third positions of the first feature points and the second feature points in the corresponding components according to the second positions of the first feature points, the second feature points, and the at least one pre-generated third model.

19. The feature point detection apparatus according to claim 18, wherein the pre-generated first model includes shape curves among the first feature points and the second feature points in the corresponding components, position relations among the components of the face, and an average shape of the face in which the first feature points and the second feature points are labelled out in the corresponding components.

20. The feature point detection apparatus according to claim 19, wherein the second estimation includes:
    estimating, as a third estimation, as for the second feature points in one component that includes the first feature points, the second positions of these second feature points based on the shape curve among the first feature points and the second feature points in this component, and estimating, as a fourth estimation, as for the second feature points in one component that does not include the first feature points, the second positions of these second feature points based on the position relations among this component and the corresponding components that include the first feature points.

21. A non-transitory computer-readable storage medium storing a program to cause a computer to perform a method for a feature point detection apparatus, the method comprising:

acquiring a face region of a face in an input image;

detecting first positions of first feature points and second feature points in corresponding components of the face according to a pre-generated first model, wherein at least one of the components of the face includes the first feature points, and wherein the first feature points are feature points whose average deviations of feature changing in the corresponding components are less than a first threshold;

estimating, as a first estimating, second positions of the first feature points in the corresponding components according to the first positions of the first feature points and at least one pre-generated second model; and updating the first positions of the first feature points and the second feature points third positions of the first feature points and the second feature points in the corresponding components according to the second positions of the first feature points, the first positions of the second feature points, and at least one pre-generated third model.

* * * * *